United States Patent [19]

Covey

[11] Patent Number: 5,218,564
[45] Date of Patent: Jun. 8, 1993

[54] LAYOUT EFFICIENT 32-BIT SHIFTER/REGISTER WITH 16-BIT INTERFACE

[75] Inventors: D. Kevin Covey, of San Jose, Calif.

[73] Assignee: National Semiconductor Corporation, Santa Clara, Calif.

[21] Appl. No.: 712,208

[22] Filed: Jun. 7, 1991

[51] Int. Cl.[5] .............................................. G06F 7/38
[52] U.S. Cl. ................................................. 364/750.5
[58] Field of Search ............ 364/736, 745, 748, 750.5, 364/760

[56] References Cited

U.S. PATENT DOCUMENTS

| | | | |
|---|---|---|---|
| 4,490,805 | 12/1984 | Tamura | 364/750.5 |
| 4,597,053 | 6/1986 | Chamberlin | 364/750.5 |
| 4,761,753 | 8/1988 | Izumisawa | 364/736 |
| 4,811,267 | 3/1989 | Ando et al. | 364/736 |
| 4,817,047 | 3/1989 | Nishitani et al. | 364/736 |
| 4,928,259 | 5/1990 | Galbi et al. | 364/745 |
| 4,941,119 | 7/1990 | Moline | 364/745 |
| 4,942,547 | 7/1990 | Joyce et al. | 364/748 |

OTHER PUBLICATIONS

"TMS320C25 User's Guide (Preliminary)" by Texas Instruments date: Aug. 1988.

*Primary Examiner*—Long T. Nguyen
*Attorney, Agent, or Firm*—Limbach & Limbach

[57] ABSTRACT

An integrated circuit processor architecture that implements digital signal processing (DSP) functions with less hardware, improved speed and a more efficient layout. The central processing unit (CPU) resources are used in conjunction with an integrated multiply/accumulate unit to perform DSP operations. Use of the CPU's internal register for the circular buffer of the DSP multiply/accumulate function allows a minimum amount of lower speed hardware to be used for the multiply/accumulate unit and permits DSP operations to be performed in parallel. The multiply/accumulate unit takes advantage of the inherent accumulating properties of conventional multiplier designs to perform multiplication of two signed binary numbers using the modified Booth's algorithm but in both reduced cycle time and hardware requirements. This is accomplished by using the adder within the multiplier to sum the product terms. Instead of clearing the adder of the result of one multiplication before beginning another, the result is maintained and all subsequent partial products are added to it to generate a final output. The placement of the 32-bits of the multiply/accumulate unit's multiplicand register is arranged in two rows of 8 even bits and two rows of 8 odd bits to allow left shift by two with a single loop around and to provide direct interface with the 16-bit data latch register on its input and the rest of the 32-bit arithmetic logic unit (ALU) on its output.

1 Claim, 23 Drawing Sheets

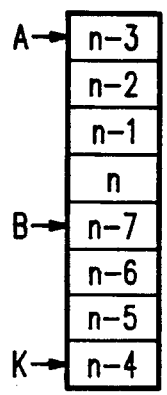 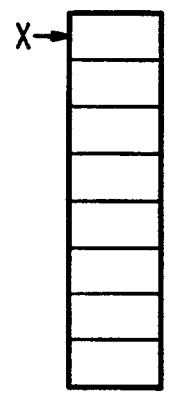
FIG. 6A  FIG. 6B
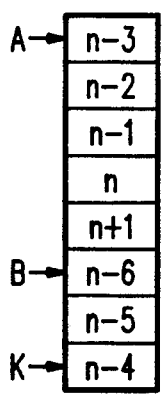 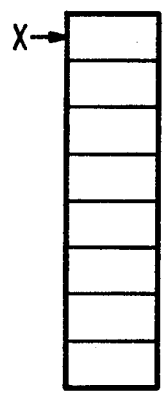
FIG. 7A  FIG. 7B

EXAMPLE  (2x3) + (7x-5) = -29

| MULTIPLIER | PAD BIT | MULTIPLICAND | RESULT |
|---|---|---|---|
| 0011 | 0 | | 0000 0000 |
| └──→ SUBTRACT | | 1x  0010 | -0000 0010 |
| | | | 1111 1110 |
| 0000 | 1 | | |
| └──→ ADD | | 1x  1000 | +0000 1000 |
| | | | 0000 0110 |

RETRIEVE NEW MULTIPLIER & MULTIPLICAND

| 1011 | 0 | | |
|---|---|---|---|
| └──→ SUBTRACT | | 1x  0111 | -0000 0111 |
| | | (FROM FIRST PRODUCT) | 1111 1111 |
| 0010 | 1 | | |
| └──→ SUBTRACT | | 1x  1100 | -0001 1100 |
| | | | 1110 0011 |

LAYOUT EFFICIENT 32-BIT SHIFTER/REGISTER WITH 16-BIT INTERFACE

BACKGROUND OF THE INVENTION

1. Field of the Invention

The present invention relates to microprocessors and, in particular, to a data processing system architecture that efficiently integrates a low-cost multiply/accumulate unit.

2. Discussion of the Prior Art

As shown in FIG. 1, a microprogrammed integrated circuit data processing system 10 includes a central processing unit 12 to manipulate data in accordance with operating software that comprises a set of program instructions. Data and program instructions utilized by the CPU 12 are stored in an associated memory 14. Transfer of instructions and data between the CPU 12 and the memory 14 is implemented by a bus interface mechanism which can be part of the CPU 12. Communication between the system 10 and other systems or peripheral devices is accomplished via an input/output device 16.

The memory 14 is typically organized in words, each containing N bits of information, i.e., instructions or data, and each having an address that specifies its location in the memory 14. The CPU 12 retrieves (reads) or provides (writes) information a word at a time by addressing a storage location in the memory 14 and either reading the word stored in that location or writing new information into that location.

Since accessing memory 14 is a slow process relative to the data processing speed of the CPU 12, as shown in FIG. 2, the CPU 12 usually includes an internal register file 18 comprising a number of its own registers which can be read or written very quickly. Since the register file 18 is internal to the CPU 12, many operations can be carried out by the CPU 12 without accessing the memory 14.

As further shown in FIG. 2, the CPU 12 also includes an arithmetic logic unit (ALU) 20 that actually performs the data manipulations specified by the program instructions. The ALU 20 usually receives two operands from the register file 18 via a multiplexor MUX and provides a single result at its output. In some CPU architectures, one of the input operands is always stored in a special internal accumulator register and the result of an ALU operation is always written into this accumulator register.

The CPU 12 also typically includes a shifter 22 for shifting the contents of an internal register, or as shown in FIG. 2, the output of the ALU 20, one or more bits in either direction to provide multiply and divide capability.

Thus, the CPU 12 includes all of the elements necessary to perform all arithmetic and logical data manipulations specified by a program instruction.

To implement a flow of program instructions, that is, to execute the microprocessor's operating program, the CPU 12 relies on a program counter (PC) 24 and its associated control logic to retrieve a series of program instructions and associated data from memory 14. The program counter 24 may simply increment itself through a sequence of program instruction addresses or modify the normal flow of program instructions by responding to special conditions which cause the program counter to "jump" or "branch" to instruction subroutines that depend on the special condition.

In a microprogrammed processor, the actual execution of a particular program instruction is accomplished by performing a specific sequence of microinstructions. Each microinstruction provides the control signals needed to set the ALU 20 to perform a corresponding "micro-operation" and specifies the next microinstruction in the microinstruction sequence for that program instruction.

In some applications, the processor's instruction set includes a program instruction that initiates a microinstruction sequence for performing a series of repetitive math operations to sample or condition data. For example, in so-called digital signal processing (DSP) applications, the processor recovers digital data from a modulated analog input signal utilizing a filtering technique that includes iterative multiply and accumulate steps based on the number of "taps" included in the filter.

A typical DSP multiply-accumulate microinstruction sequence is shown in FIG. 3. First, data is fetched from a sample buffer. Next, filter tap coefficient data is fetched from a coefficient memory. The retrieved data sample (multiplier) and the coefficient (multiplicand) are then multiplied and the resulting product term is added to an accumulating register. The memory pointers are then incremented to repeat the procedure for each filter tap, with product terms being accumulated throughout the procedure to provide a final filter output. The faster the filter throughput, the faster the data can be recovered.

In one prior art approach, the Texas Instruments TI320 DSP Microprocessor, a very fast multiply/accumulate instruction is incorporated into the processor's instruction set. This instruction allows the processor to fetch data, perform the math operations and manage the sample/coefficient memory fast enough to permit practical use of the TI320 processor in DSP applications.

A recognized improvement to the Texas Instruments approach is to add a circular buffer manager unit to the processor. This speeds up the microprocessor by off-loading responsibility for data management.

A circular buffer can be implemented in a number of ways. One popular technique utilizes a set of registers pointing to corresponding locations in memory. One pointer points to the active filter tap sample; this is a dynamic pointer that sequences to the next sample after each multiply operation. A second pointer points to the top of the sample stack. A third pointer points to the bottom of the stack. The circular buffer manager keeps track of the active sample pointer. When the active sample pointer matches the third pointer, it is reloaded to the top of the stack.

It would, however, be desirable to have available a microprocessor that implements a multiply/accumulate function with as few clock cycles as possible for a reasonable hardware cost.

SUMMARY OF THE INVENTION

The present invention provides a processor architecture that implements digital signal processing (DSP) functions with improved efficiency.

Rather than adding logic to the core central processing unit (CPU), the resources of the CPU are used in conjunction with an integrated, low cost multiply/accumulate unit to perform DSP functions. Use of the CPU's internal registers for the circular buffer of the multiply/accumulate function allows a minimum amount of lower speed hardware to be used for the multiply/accumulate unit and permits the DSP operations to be performed in parallel. In the basic implementation, the CPU uses its registers, bus interface unit and sequencing microcode to feed the multiply/accumulate unit. That is, while the bus interface unit fetches data from memory and the CPU manages the circular buffer, the multiply/accumulate unit does the math required for the DSP operation. An added advantage of this architecture is that the interrupt latency time of the CPU is dramatically improved, since the CPU does not have to wait for the multiply/accumulate operation to finish before servicing interrupts.

The multiply/accumulate unit performs multiplication of two 16-bit signed numbers to yield a 32-bit signed result using the modified Booth's algorithm, but in reduced cycle time and without the need for a dedicated 32-bit accumulator register. This is done by taking advantage of the inherent accumulating properties in most multiplier designs. That is, the adder that is used within the multiplier is also used to sum the product terms. Instead of clearing out the result in the multiplier's adder of one multiplication prior to the start of another, the result is kept in the adder and all of the subsequent partial products found during the course of the next multiplication are added to it. Using this technique for a 16×16 bit multiply/accumulate operation yields the result of a sum of products calculation more than 10% faster than conventional methods at an appreciably lower hardware cost.

In accordance with the invention, the placement of the 32 bits in the multiplicand register is arranged to most efficiently left shift in implementing the modified Booth's algorithm and to also interface with the ALU bit slice. The multiplicand bits are placed into 4 rows of 8 bits. The two rows of even and two rows of odd bits allow left shift by two with a single loop around and direct interface with the 16-bit data latch register on its input and the rest of the 32-bit ALU on its output.

A better understanding of the features and advantages of the present invention will be obtained by reference to the following detailed description and accompanying drawings which set forth an illustrative embodiment in which the principles of the invention are utilized.

DESCRIPTION OF THE DRAWINGS

FIG. 6A is a diagrammatic illustration of a circular buffer utilizable in accordance with the present invention.

FIG. 6B is a diagrammatic illustration of a fixed coefficient buffer utilizable in accordance with the present invention.

FIG. 7A is a diagrammatic illustration of the FIG. 6A circular buffer after completion of a multiply/accumulate operation on sample B (n-7) in FIG. 6A.

FIG. 7B is a diagrammatic illustration of the re-initialization of the FIG. 6B coefficient buffer after completion of a multiply/accumulate operation on sample B (n-7) in FIG. 6A.

DETAILED DESCRIPTION OF THE INVENTION

Figure 1:
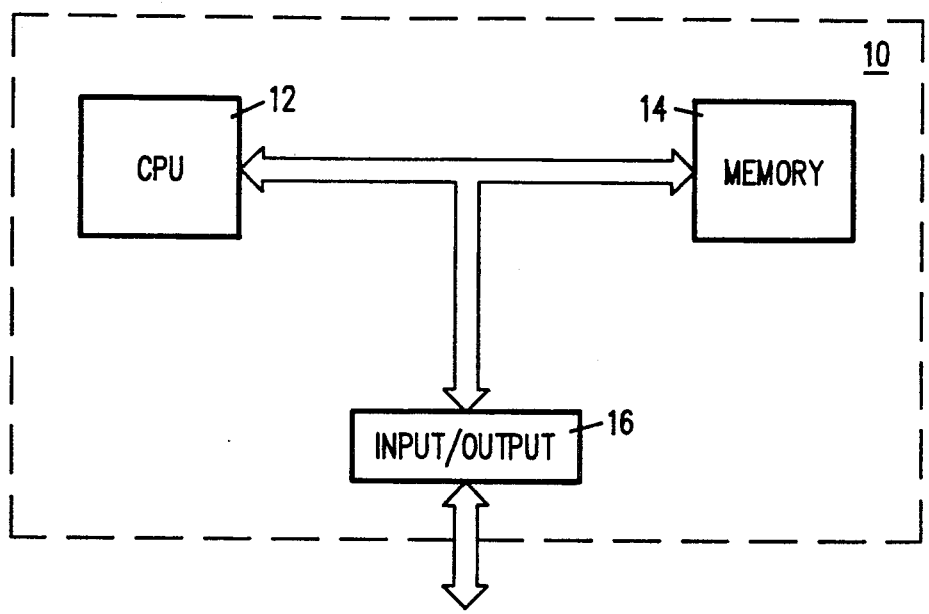
FIG. 1 is a block diagram illustrating a conventional microprocessor architecture.
Figure 2:
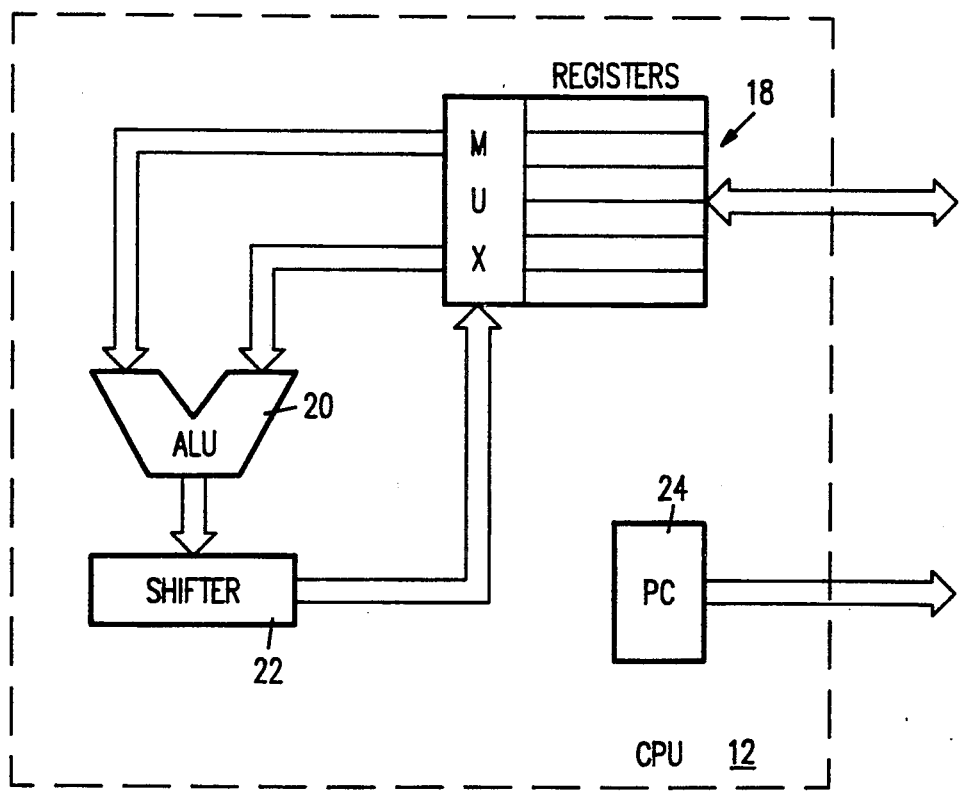
FIG. 2 is a block diagram illustrating a conventional central processing unit (CPU) architecture.
Figure 3:
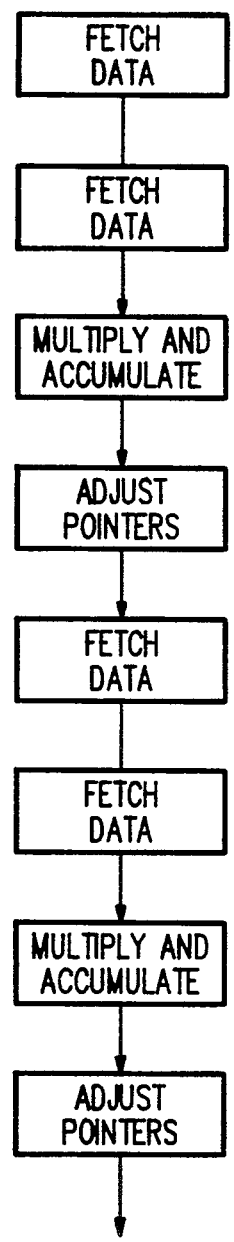
FIG. 3 is a simple flow chart illustrating the general steps involved in performing a DSP function utilizing a conventional microprocessor.
Figure 4:
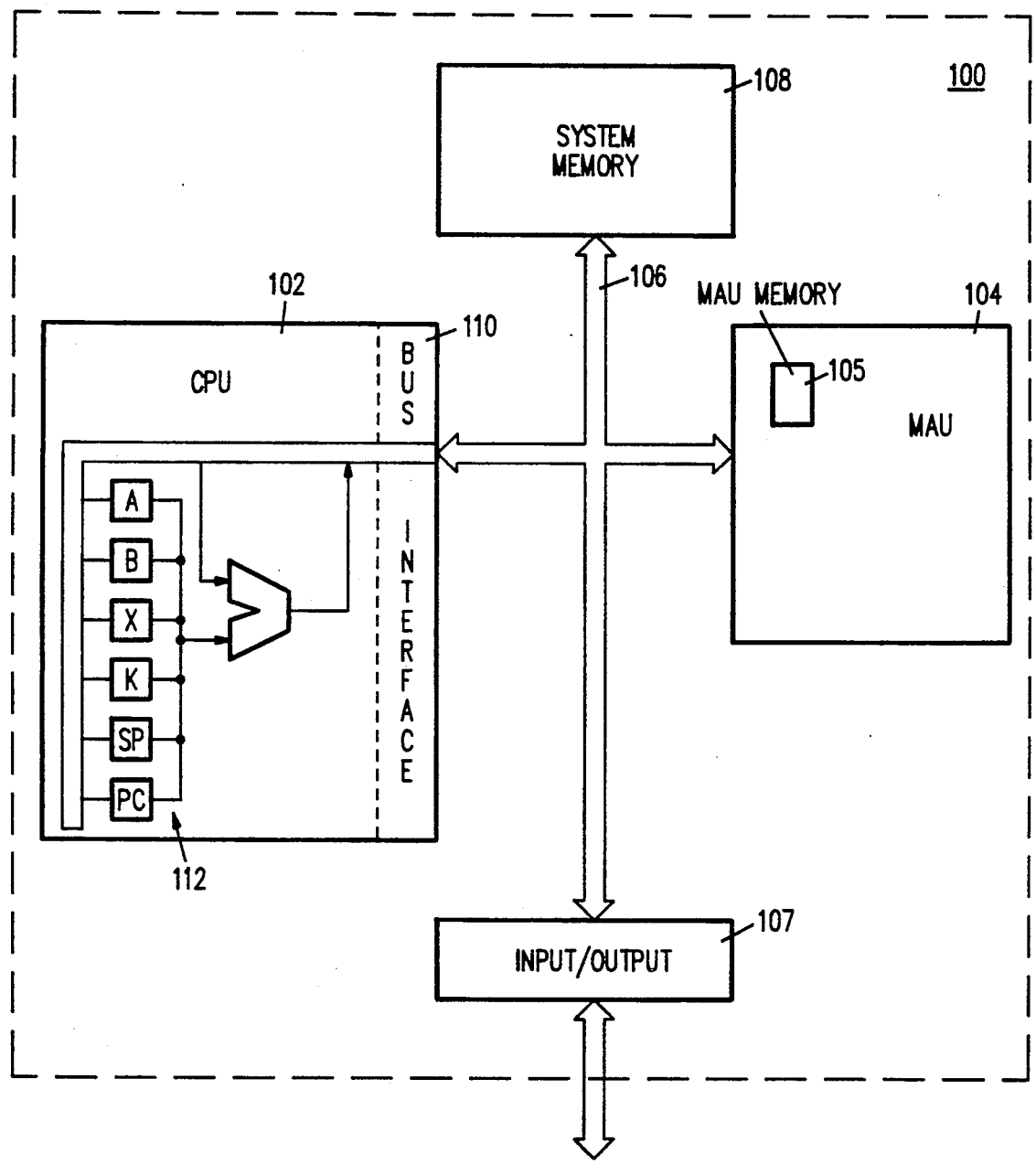
FIG. 4 is a simple block diagram illustrating a microprocessor architecture in accordance with the present invention.

FIG. 4 shows the general architecture of a data processing system 100. System 100 is described below as implemented in a single integrated circuit; however, it is not limited to IC architectures.

The processor system 100 includes a conventional central processing unit (CPU) 102 for performing general purpose data processing functions and, in accordance with an aspect of the present invention, a high speed, low cost (8 cycle) multiply/accumulate unit (MAU) 104 for performing certain digital signal processing (DSP) functions. Both the CPU 102 and the MAU 104 are connected to a system bus 106 for communication with a system memory 108 which stores program instructions and data utilized by the system 100 (Those skilled in the art will appreciate that the program instructions and data could be stored in separate memory devices.). The CPU 102 includes a conventional bus interface mechanism 110 for implementing transfer of instructions and data between the memory 108 and the CPU 102 via the system bus 106. The MAU 104 "snoops" the system bus 106, retrieving all data read by the CPU 102 into a storage element 105 within the MAU 104. As in the case of conventional architectures, the system 100 communicates with other systems or with peripheral devices via an input/output device 107.

In the disclosed embodiment of the system 100, and as described in greater detail below, special multiply/accumulate instructions are included in the standard program instruction set of the CPU 102 to allow easy implementation of DSP functions utilizing MAU 104. In addition, the internal register file 112 of the CPU 102 is utilized in implementing a circular sample buffer and fixed coefficient buffer, eliminating the need for extra hardware in the multiply/accumulate unit (MAU) 104, while allowing the CPU 102 and the MAU 104 to operate in parallel to perform DSP operations.

Figure 5:
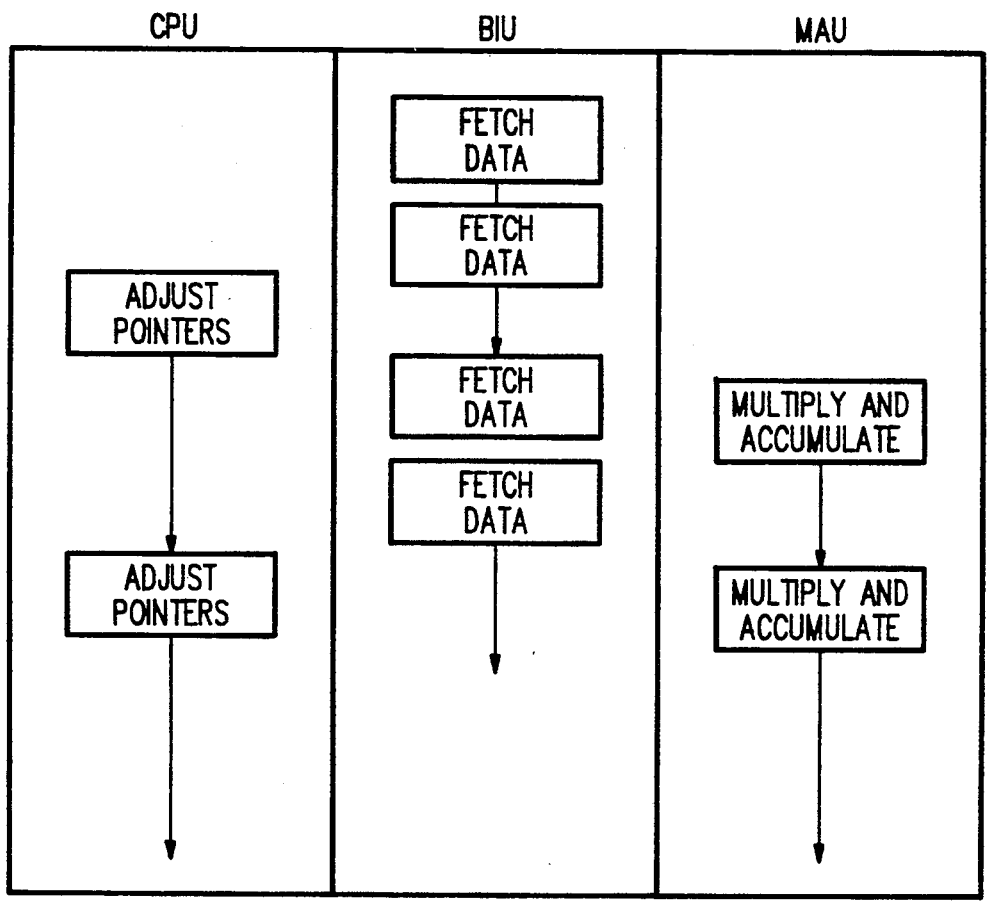
FIG. 5 is a simple flow chart illustrating the general parallel steps executed by the FIG. 4 microprocessor in performing a DSP function in accordance with the present invention.

As shown in the FIG. 5 flow chart, in performing a DSP function, the CPU's bus interface mechanism 110 fetches data from system memory 108 while the CPU 102 manages the data pointers of the circular buffer and coefficient memory and the MAU 104 takes data from the system bus 106 and performs the math operations (multiply/accumulate) required by the DSP operation.

As stated above, the internal registers 112 of the CPU 102 are utilized to implement the circular buffer that stores the DSP data samples and a fixed buffer that stores DSP filter tap coefficients.

As shown in FIG. 4, register "A" in the register file 112 of CPU 102 stores the pointer value of the top of the circular buffer storage, which is physically located in system memory 108. Register "K" stores the pointer value of the bottom of the circular buffer. Register "B" is dynamic, sequentially storing the pointer value of the active circular buffer sample. Register "X" stores the pointer value of the active coefficient stored in the coefficient list, which is also physically part of system memory 108.

Examples of an 8-deep circular buffer and fixed buffer are shown in FIGS. 6A and 6B, respectively. As shown in FIGS. 6A and 6B, at the beginning of a filter pass, register B points at the oldest sample (n-7) in the circular buffer. Registers A and K indicate the physical bounds of the buffer, i.e., the first and last elements, respectively. Register X indicates the first element of the coefficient list.

In performing a DSP multiply/accumulate operation, the system 100 executes one multiply/accumulate instruction for each sample in the FIG. 6A circular buffer, accumulating the result in a result register.

At the end of a filter pass, register B returns to its original position, register X points one element beyond the coefficient list, and registers A and K are unchanged. Thus, as shown in FIGS. 7A and 7B, in the register setup after acquiring the next sample, the new sample (n+1) replaces the oldest sample in the buffer, register B is incremented (and maybe wrapped) to indicate the current oldest sample, and the other registers are initialized as before.

The specific microinstruction sequence performed by the system 100 in executing a multiply/accumulate instruction is as follows.

First, the bus interface mechanism 110 fetches a 16-bit sample (multiplier) pointed to by the register B, i.e., the sample pointer of the circular buffer. As part of the normal "snooping" operation of the MAU 104, this value is stored within the MAU 104. The B pointer is then incremented by two bytes and the new register B value is compared with the bottom address K of the circular buffer; if B>K, then register B is loaded from register A to point to the top of the circular buffer. Next, a 16-bit coefficient (multiplicand) pointed to by register X, i.e., the pointer of the fixed buffer is fetched and register X is incremented by two bytes. This data is also issued to the MAU 104 and a multiply-accumulate operation is initiated. On completion of the multiply-accumulate operation, the result is accumulated in the result register (MRR).

Additionally, and as described in greater detail below, execution of a multiply/accumulate instruction affects two status bits (MVP bit and MVN bit) of the CPU 102. The MVP bit is set to a "1" if a signed (2's complement) overflow occurred in the positive direction as a result of the accumulation substep (overflow from the multiplication substep is impossible). If the overflow occurred in the negative direction, then the MVN bit is set instead. Neither of these bits is affected by the MAU 104 if the other is already set.

By stringing a sequence of multiply/accumulate instructions, the processor system 100 can perform a multiply-accumulate operation every 8 cycles. At a 20 MHz internal clock frequency, this provides a 400 ns multiply-accumulate operation, including data fetching and circular buffer management. Those skilled in the art will appreciate that the opcode of the first multiply/accumulate instruction in the sequence will differ from that of the standard multiply/accumulate instruction in that it must reset the result register to zero.

Table I below summarizes the microcode sequence for execution of the standard multiply/accumulate instruction.

TABLE I

Cycle-by-Cycle Activity for MAC Instruction Sequence

| Cycle | Bus | Action |
|---|---|---|
| 1 | X Reg. contents | Address of [X] operand |
| 2 | First operand | First operand read into MAU |
| 3 | Address of MIR | Preparing to write opcode to MIR |
| 4 | Opcode | MAC opcode to MIR |
| 5 | B Reg. contents | Address of [B] operand |
| 6 | Second operand | Second operand read into MAU |
| 7 | Prefetch Addr. +1 | Instruction Address |
| 8 | Next Instruction | Prefetch Ins. |

As stated above, the MAU 104 performs multiplication of two 16-bit signed numbers to yield a 32-bit result. This allows the calculation of sum of products equations that are commonly used in DSP applications. These equations usually take the form of $$\text{filter output} = (a \cdot b) + (c \cdot d) + (e \cdot f) \ldots$$

Figures 8, 9:
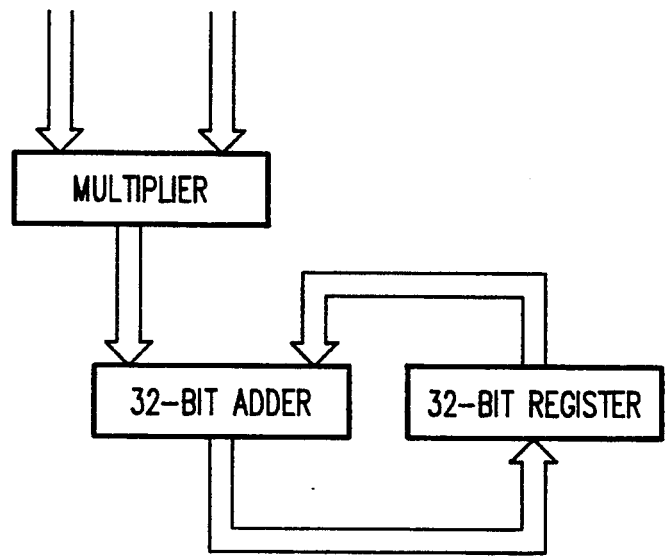
FIG. 8 is a simple block diagram illustrating the general architecture of a conventional multiply-accumulator unit.
FIG. 9 provides a computational flow of an example of implementation of the modified Booth's algorithm utilizing a multiplier/accumulator unit in accordance with the present invention.

Referring to FIG. 8, the conventional method of obtaining the desired filter output is to calculate each of the 16-bit product terms (e.g., a·b) using a multiplier and to add each of them, in turn, into a register that maintains the accumulated result, the accumulating register having been cleared initially. Thus, to perform a single 16×16 bit multiplication in the conventional manner (i.e., using the modified Booth's algorithm) takes 8 cycles. Adding the result into the register takes another cycle. Therefore, the conventional multiply-accumulate operation requires 9 cycles for every filter tap in the equation. Also, a 16×16 bit signed multiplier register and a 32-bit accumulator register are required.

The MAU 104 utilizes the modified Booth's algorithm for multiplying two signed 16-bit numbers and, in addition, utilizes the intrinsic accumulating nature of the modified Booth's algorithm to store the product terms as they are calculated. This dispenses with the requirement of adding the result of each product term to a dedicated register.

Thus, the equation $$x = (a \cdot b) + (c \cdot d) + (e \cdot f) \ldots$$

can be calculated using the same hardware as that used to implement a multiplier using the modified Booth's algorithm, provided the result is not cleared at the start of each multiplication.

That is, the MAU 104 achieves the same result as the technique described above in conjunction with the FIG. 8 hardware, but in only 8 cycles for every filter tap rather than 9, and without the need for a 32-bit accumulating register.

The result register that is used within the multiplier is also used to sum the product terms. Rather than clearing out the result in the multiplier's result register of one multiplication prior to the start of another, the result is kept in the result register and all of the subsequent partial products generated during the course of the next multiplication are added to it. (As stated above, the opcode of the first multiply/accumulate instruction clears the result register.)

The modified Booth's algorithm for binary multiplication is summarized in Table II below.

TABLE II

| Modified Booth's Algorithm | | | |
|---|---|---|---|
| MULTIPLIER BIT 1 | BIT 0 | PAD BIT | OPERATION |
| 0 | 0 | 0 | Add Nothing |
| 0 | 0 | 1 | Add 1 × multiplicand |
| 0 | 1 | 0 | Add 1 × multiplicand |
| 0 | 1 | 1 | Add 2 × multiplicand |
| 1 | 0 | 0 | Subtract 2 × multiplicand |
| 1 | 0 | 1 | Subtract 1 × multiplicand |
| 1 | 1 | 0 | Subtract 1 × multiplicand |
| 1 | 1 | 1 | Subtract Nothing |

The modified Booths' algorithm provides that the multiplier value be shifted right 2 places, through the pad bit, and that the multiplicand value be shifted left 2 places, after each clock pulse.

The following 4-bit calculation provides an example:

$$\text{filter output} = (2 \times 3) + (7x - 5) = -29$$

Referring to the computational progression provided in FIG. 9, initially, the adder contains the value 0000 0000. The bit 1/bit 0 (bit 1/0) values of the multiplier value 0011 (3) and the pad bit value 0 (i.e. 110) call for subtracting 1× the multiplicand value 0010 (2). Thus, after the first computational cycle, the adder contains the partial product value 1111 1110. After the appropriate modified Booth's algorithm shift in both the multiplier and the multiplicand values, the shifted multiplier value bit 1/0+pad bit combination (i.e., 001) calls for adding 1× the shifted multiplicand value 1000. The resulting first product term is 0000 0110 (=(2×3)=6).

In a conventional multiplier-accumulator, this result would be added into an accumulating register. In the MAU 104, however, this first product term is retained inside the result register as another partial product.

After retrieving a new multiplier and multiplicand for the second product term (i.e., 7x−5), the multiplier's bit 1/0+pad bit combination 110 calls for subtracting 1× the multiplicand 0111 (−5) from the first product term, the resulting partial product being 1111 1111. After shifting the multiplier value and the multiplicand value, the shifted multiplier bit 0/1+pad bit combination calls for subtracting 1× the shifted multiplicand value 1100, the resulting final accumulated product being 1110 0011, i.e., −29, the accumulated sum of the products (2×3)+(7x−5).

Using this technique for a 16×16 bit multiplier/accumulate unit 104 yields a sum of products calculation more than 10% faster than conventional methods at an appreciably lower hardware cost.

Figure 10A:
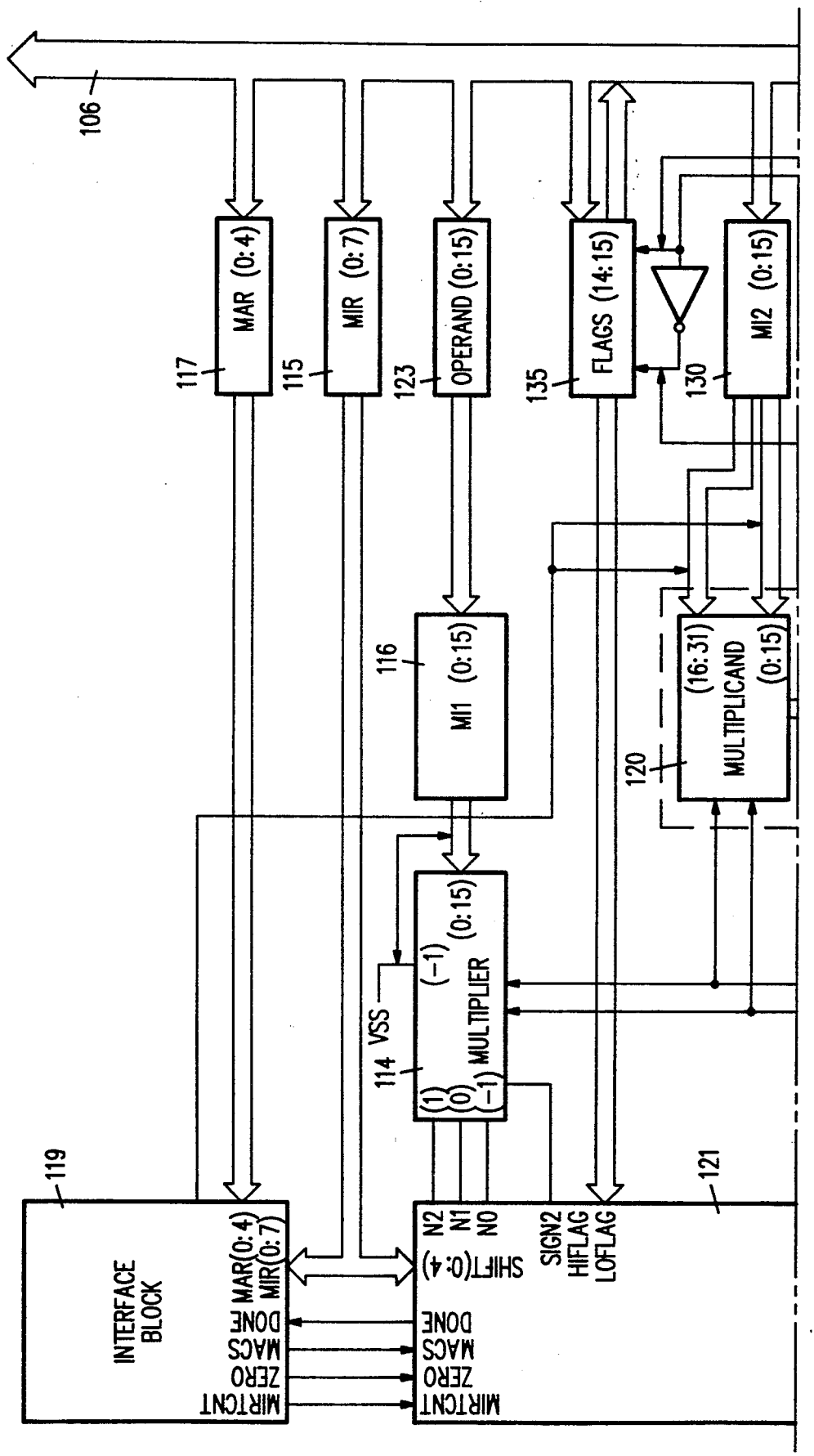
FIG. 10 includes FIGS. 10A, 10B, 10C and these figures show a block diagram illustrating a multiplier/accumulator unit in accordance with the present invention.
Figure 10B:
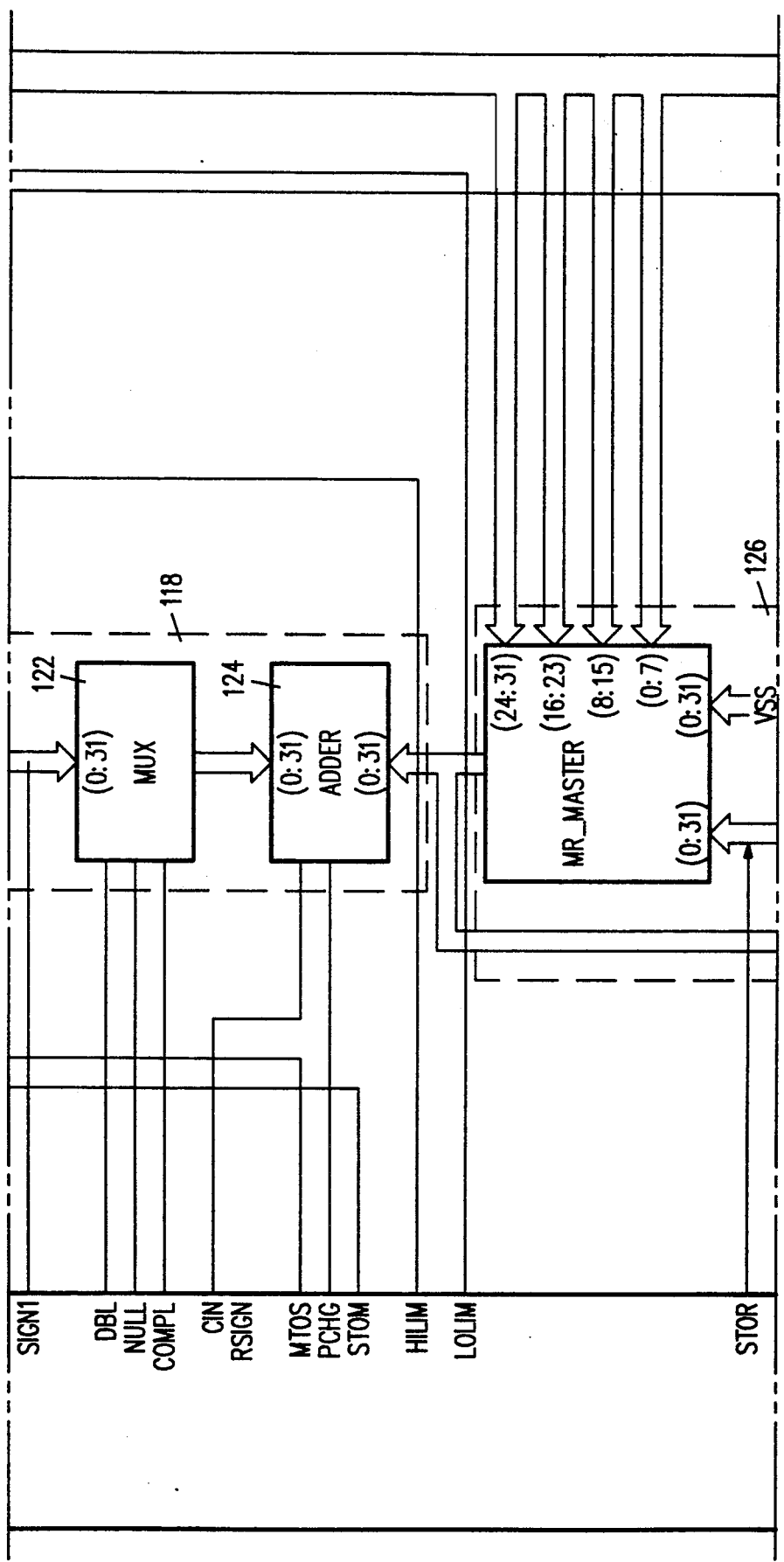
Figure 10C:
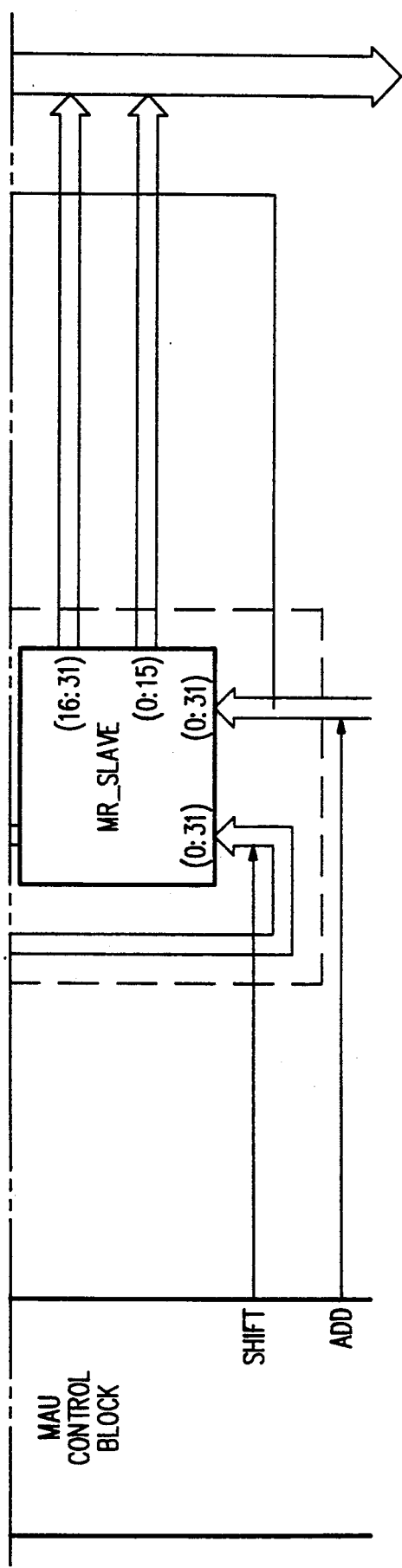

FIG. 10 shows a hardware embodiment of a MAU 104 that includes a Multiplier register 114 and a bit-slice block 118 that includes a 32-bit register/double bit left shifter (Multiplicand) 120, 32 instances of a 5 to 1 mux (Mux) 122, a 32-bit adder (cell) 124, and a 32-bit Result Register/Arithmetic Right Shifter 126.

In the execution of a multiply/accumulate operation, the CPU 102 reads a first multiply/accumulate instruction in a sequence of such instructions from the system bus 106, the instruction opcode bits (0:7) being issued to the MIR register 115 in the MAU 104. The X register in the CPU 102 then references the first operand for this instruction, the X address, bits (0:4) also being issued to the MAR register 117 in the MAU 104.

As can be seen from FIG. 10, the contents of the MIR register 115 and the MAR register 117 are provided to the MAU's interface block 119 and MAU control block 121 which decodes this data for use in managing the MAU 104 during the execution of the instruction.

The first operand is then placed on the system bus 106 and stored to the operand register 123. The CPU 102 then references the second operand which is stored in the MI2 register 130; at the same time the first operand is transferred from the operand register 123 to the MI1 register 116. In the next cycle, the contents of the MI1 and MI2 registers 116, 130 are transferred to the multiplier register 114 and multiplicand register 120, respectively.

The MAU 102 then begins the multiply sequence of the modified Booth's algorithm (as described above) utilizing the multiplicand register 120, Mux 122 and Adder 124 of the bit slice block 118, accumulating the result in result register 126.

The MAU 102 repeats this procedure for the following string of standard multiply/accumulate instructions, one such instruction for each filter tap sample in the circular buffer, accumulating the final result in the result register 126.

As shown in FIG. 10, the result register 126 can be loaded as four bytes, or two 16-bit words, from the system bus 106 and writes two words to the system bus 106.

The bit slice block 118 is laid out as eight placements of a bit slice. Each bit slice contains 4 each of the Multiplicand cell 120, the Mux cell 122 and the adder cell 124. The adder carry bypass and result register are not part of the bit slice.

The Multiplicand register 120 is a 32-bit register/shifter. As shown in FIG. 10, bits (0:15) are loaded from the MI1 register 116. After the sign extended data is loaded from the MI1 register 116, the Multiplicand register 120 shifts it two places to the left under control of the MAU control block 121. Zeros are shifted into the two least significant bits (LSB) each time. The most significant bit (MSB) of the Multiplicand, bit (31) is output as a signal SIGN1 to the MAU control block 121. All 32-bits of the Multiplicand are input to the Mux block 123. The following signals are used to load and shift the Multiplicand register 120:

$$strtexq = STRTEX \cdot NC2$$

The contents of the Multiplicand register 120 is shifted two bits at a time to the left under control of the MAU control block 121. The signals for doing this are mtosq and stomq. These signals are created according to the following equations:

$$mtosq = MTOS \cdot C2$$

$$stomq = STOM \cdot NC2$$

In accordance with the present invention, the Multiplicand register 120 is laid out in four rows of 8 bits each. The top row contains the even bits for the low word, i.e., bits (0, 2, 4, 6, 8, 10, 12, 14). The next row contains the even bits for the high word; bits (16, 18, 20, 22, 24, 26, 28, 30). The third row contains the odd bits for the low word, and the fourth row contains the odd bits for the high word. A bit position map is provided in in Table III below.

TABLE III

| row1 | 14 | 12 | 10 | 08 | 06 | 04 | 02 | 00 |
| row2 | 30 | 28 | 26 | 24 | 22 | 20 | 18 | 16 |
| row3 | 15 | 13 | 11 | 09 | 07 | 05 | 03 | 01 |
| row4 | 31 | 29 | 27 | 25 | 23 | 21 | 19 | 17 |

The Multiplicand register 120 is basically a master-slave latch with two inputs on the master. One of the inputs (Din2) comes from the MI2 register 130. The MI2 register 130 is built on top of the Multiplicand register 120. Its outputs connect directly to the Din2 inputs of the Multiplicand register 120. The other input to the master latch is the slave output of the bit two binary position to the right.

As stated above, the Multiplicand 120 is a 32-bit master/slave register and a double bit left shifter. The Multiplicand is loaded from a simple 16-bit data latch register MI2 130 with bit 15 sign extended for bits 16–31. A problem arises in devising a layout scheme for the 32-bit multiplicand to efficiently left shift by two, interface to the 16-bit MI2 register 130 on its input and the rest of the 32-bit ALU on its output.

Figure 11:
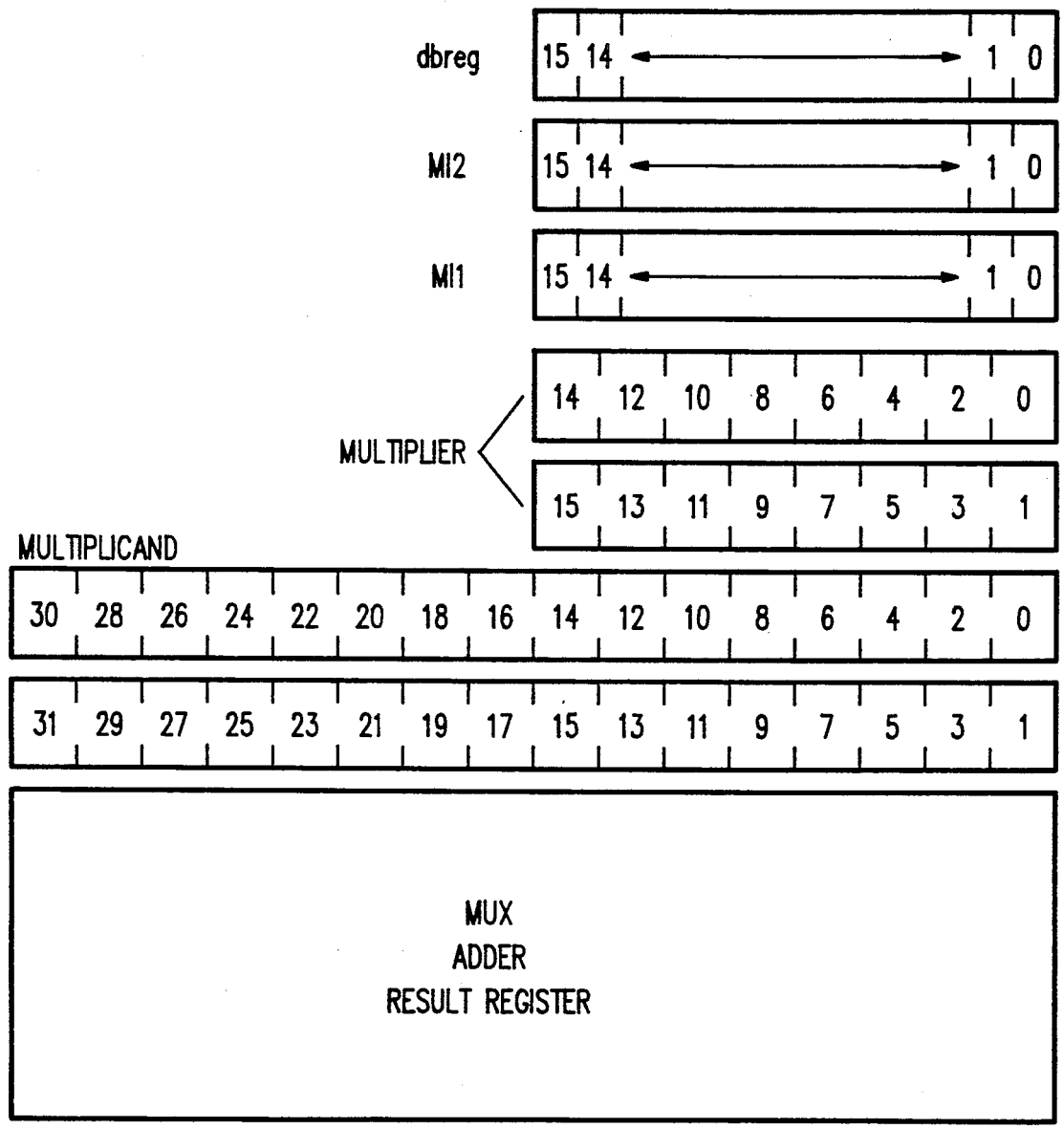
FIG. 11 is a schematic representation of a layout of a multiplicand register utilizable in the FIG. 10 multiplier/accumulator unit.

In one possible solution, shown in FIG. 11, the multiplicand bits are arranged in two rows of 16 bits, even and odd bits. This arrangement allows easy left shifting by two. The disadvantage of this arrangement is the interface to the other 16-bit latch registers in the data path.

Figure 12:
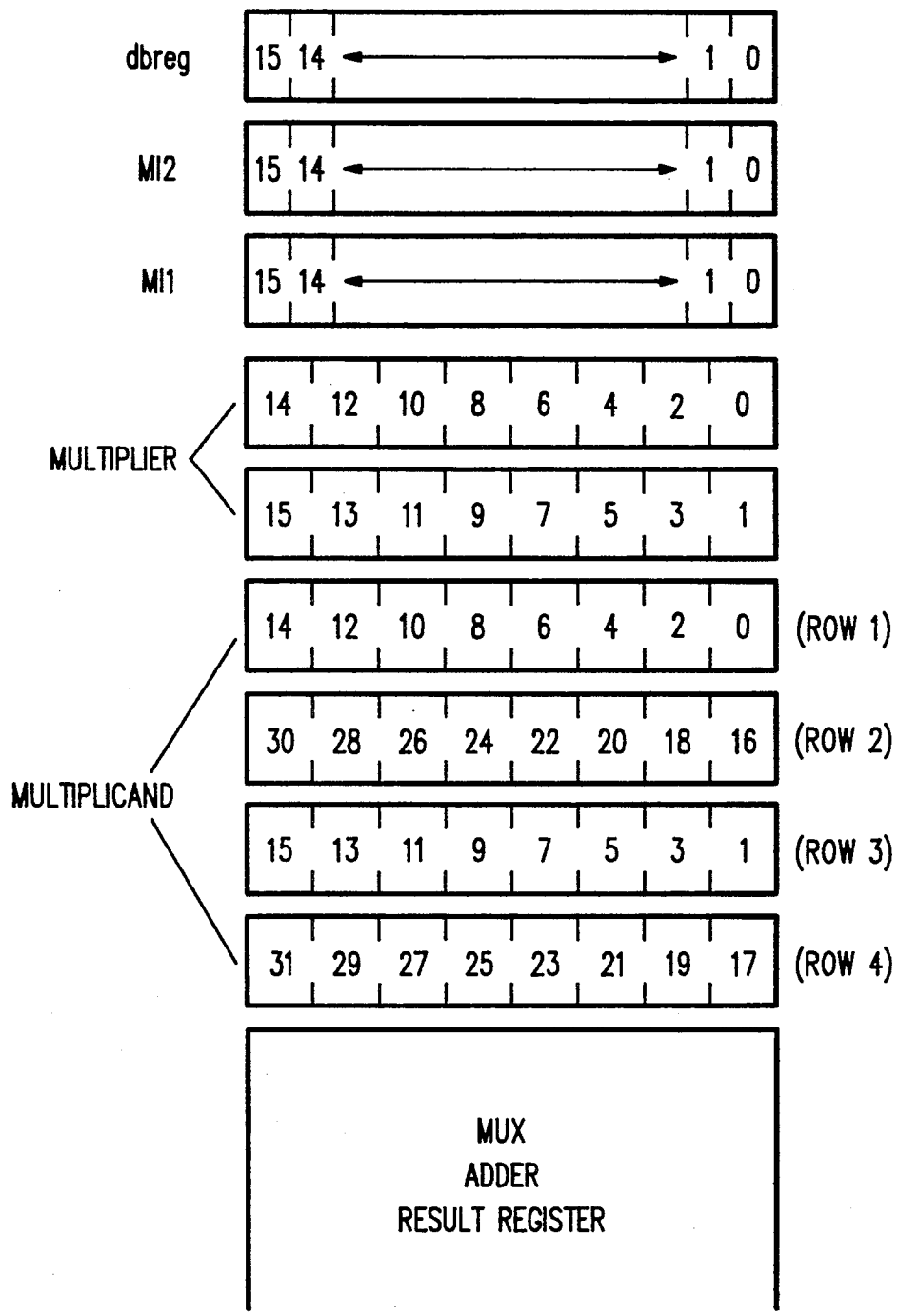
FIG. 12 is a schematic representation of an alternative layout of a multiplicand register utilizable in the FIG. 10 multiplier/accumulator unit.

A preferred solution is shown in FIG. 12. In this arrangement, multiplicand bits are placed into 4 rows of 8 bits. The two rows of even and two rows of odd bits allow the left shift by two directly across with a single loop around between bits 14–16 and bits 15–17. In addition, the 16-bit MI2 input register 130 exactly fits across the top of the multiplicand stack, making for a compact layout.

Because of the physical bit positioning in the Multiplicand register 120, a left shift by 2 is easily accomplished within the same row. The output of bit 14 must be brought around to the input of the bit 16, and the output of bit 15 must be brought around to the input of bit 17.

Figure 13:
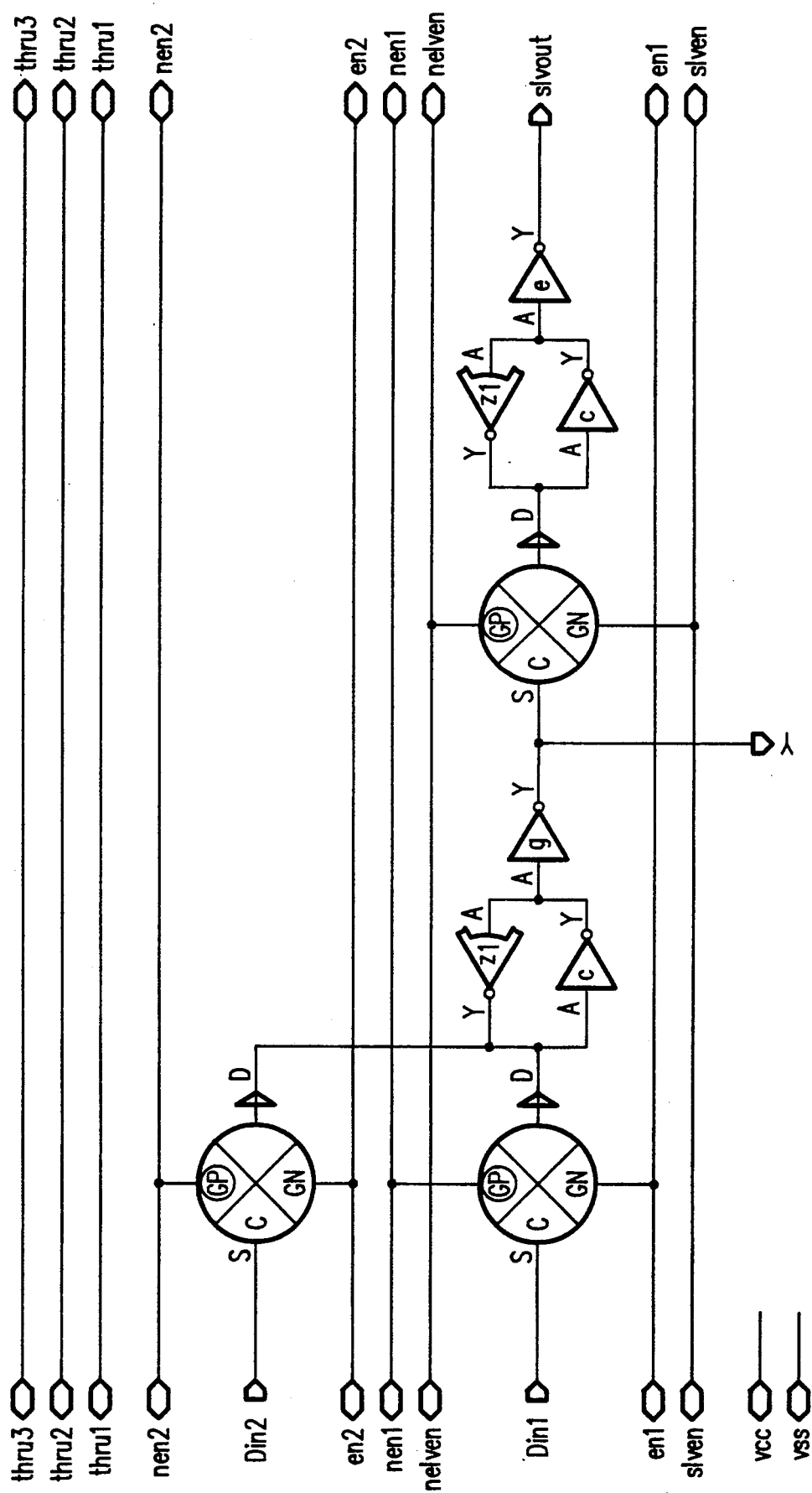
FIG. 13 is a schematic diagram illustrating a basic multiplicand cell utilizable in the FIG. 10 multiplier/accumulator unit.
Figure 14:
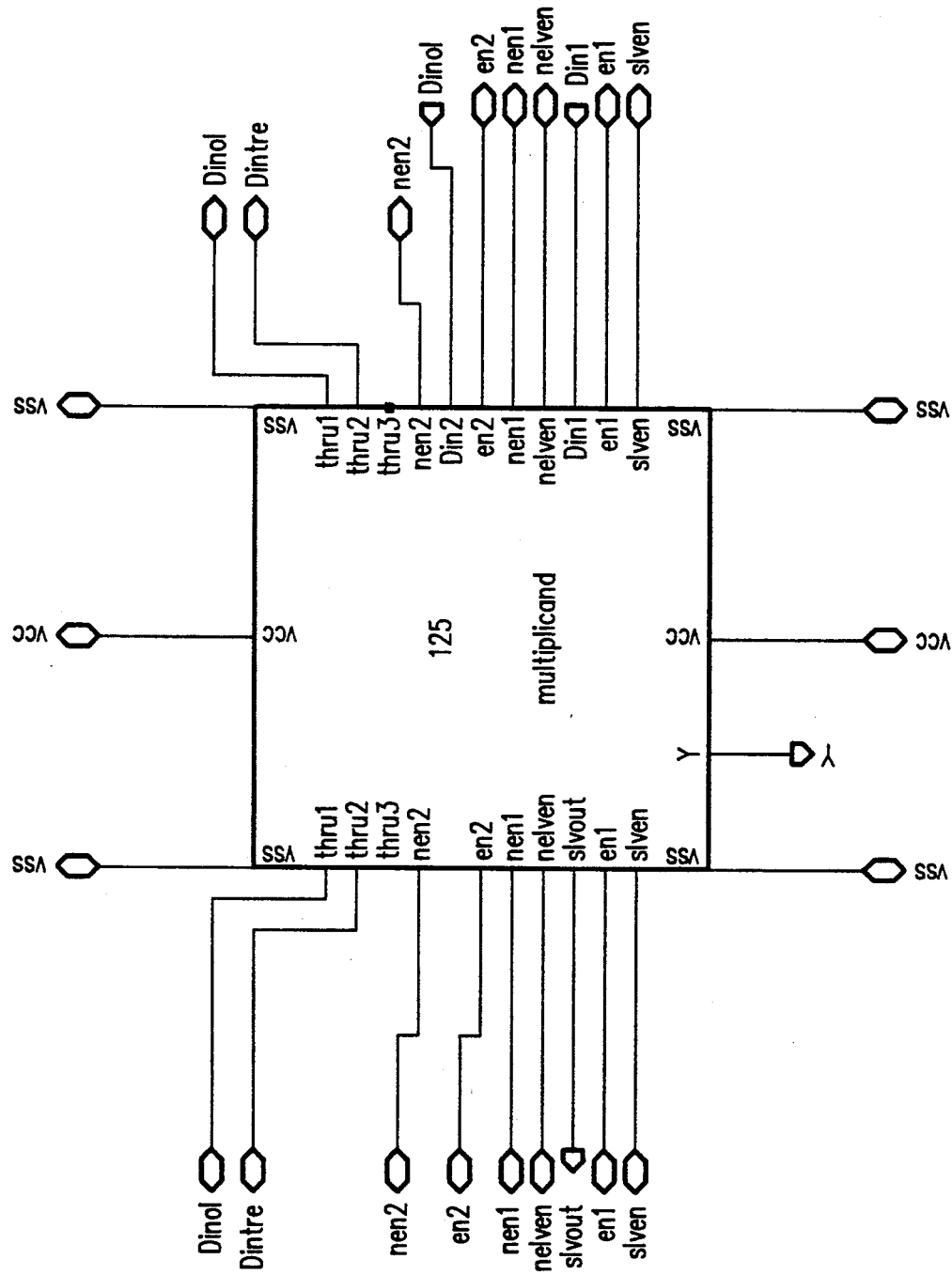
FIG. 14 is a schematic diagram illustrating the application of the FIG. 13 multiplicand cell in row 1 of the multiplicand register.

Each Multiplicand bit outputs its slave to the master to the left of it, and to two 5 to 1 Muxes. In addition, each Multiplicand cell 120 has three routing channels in it. These are used for transferring the MI2 inputs to the Multiplicand cells in rows 2, 3, 4, and for transferring the Multiplicand outputs to the Mux cells from rows 1, 2 and 3. The basic Multiplicand cell is shown in FIG. 13; the application of the cell in row 1 is shown in FIG. 14.

Figure 15:
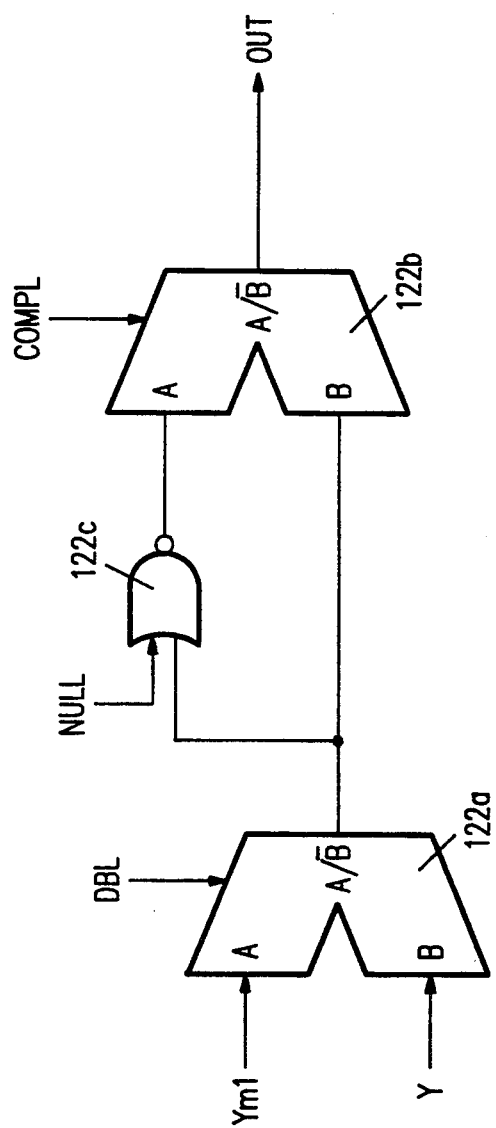
FIG. 15 is a logic diagram illustrating an embodiment of a multiplexor block utilizable in the FIG. 10 multiplier/accumulator unit.

As shown in FIG. 15, the Mux block 122 is effectively a five input one output multiplexer comprising a first stage multiplexer 122a and a second stage multiplexer 122b. The output is selected by the status of three control signals (DBL, NULL and COMPL) from the MAU control block 121. There are two data inputs to each of the 32 Muxes. The inputs are the Multiplicand output for the bit (Y) and the Multiplicand output one binary bit position to the right (Ym1). The output is determined as in the following Table IV.

TABLE IV

| INPUTS | | | OUTPUT |
| --- | --- | --- | --- |
| NULL | COMPL | DBL | A |
| 0 | 0 | 0 | Y |
| 0 | 0 | 1 | Y-1 |
| 0 | 1 | 0 | not Y |
| 0 | 1 | 1 | not Y-1 |
| 1 | 0 | 0 | Y |
| 1 | 0 | 1 | Y-1 |
| 1 | 1 | 0 | 0 |
| 1 | 1 | 1 | 0 |

As shown in FIG. 10, the output of the Mux block 122 is one of the inputs to the Adder 124. The other input comes from the result register 126. The value Y-1 refers to the Multiplicand bit one binary position to the right. For bit position zero, the value of the bit to the right is defined to be zero and is in fact connected to VSS. In order to force the transfer of the value of zero to the adder, the MAU control block 121 must make active both of the signals NULL (see XOR gate 122c in FIG. 15) and COMPL.

Figure 16:
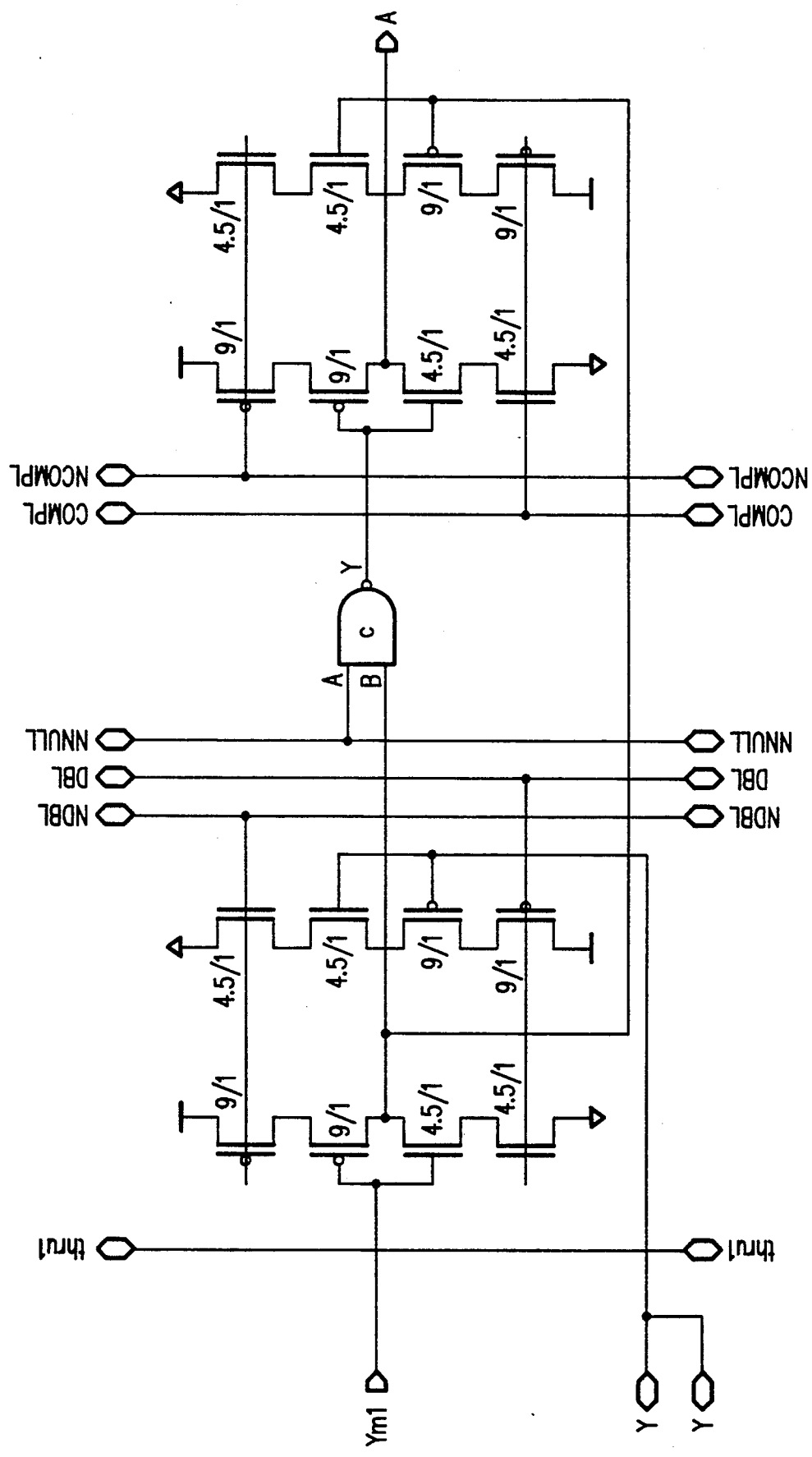
FIG. 16 is a schematic diagram illustrating a circuit embodiment of the FIG. 15 multiplexor block.

The basic Mux cell 122 is shown in FIG. 16. The Mux cell 122 makes use of tri-state inverters instead of couplers to provide high speed drive to the next stage utilizing minimal area.

There are four Mux cells 122 per bit slice. They are arranged in two rows of 16 bits each. The low word is in the first row and the high word is in the second row.

There is one routing channel in the Mux cell. In the first row, it is used to pass the Multiplicand output to the Mux input in the second row. The routing channel in the second row is used to pass the Mux output of the first row to the Adder input. The Adder is physically built directly beneath the Mux block.

Figure 17:
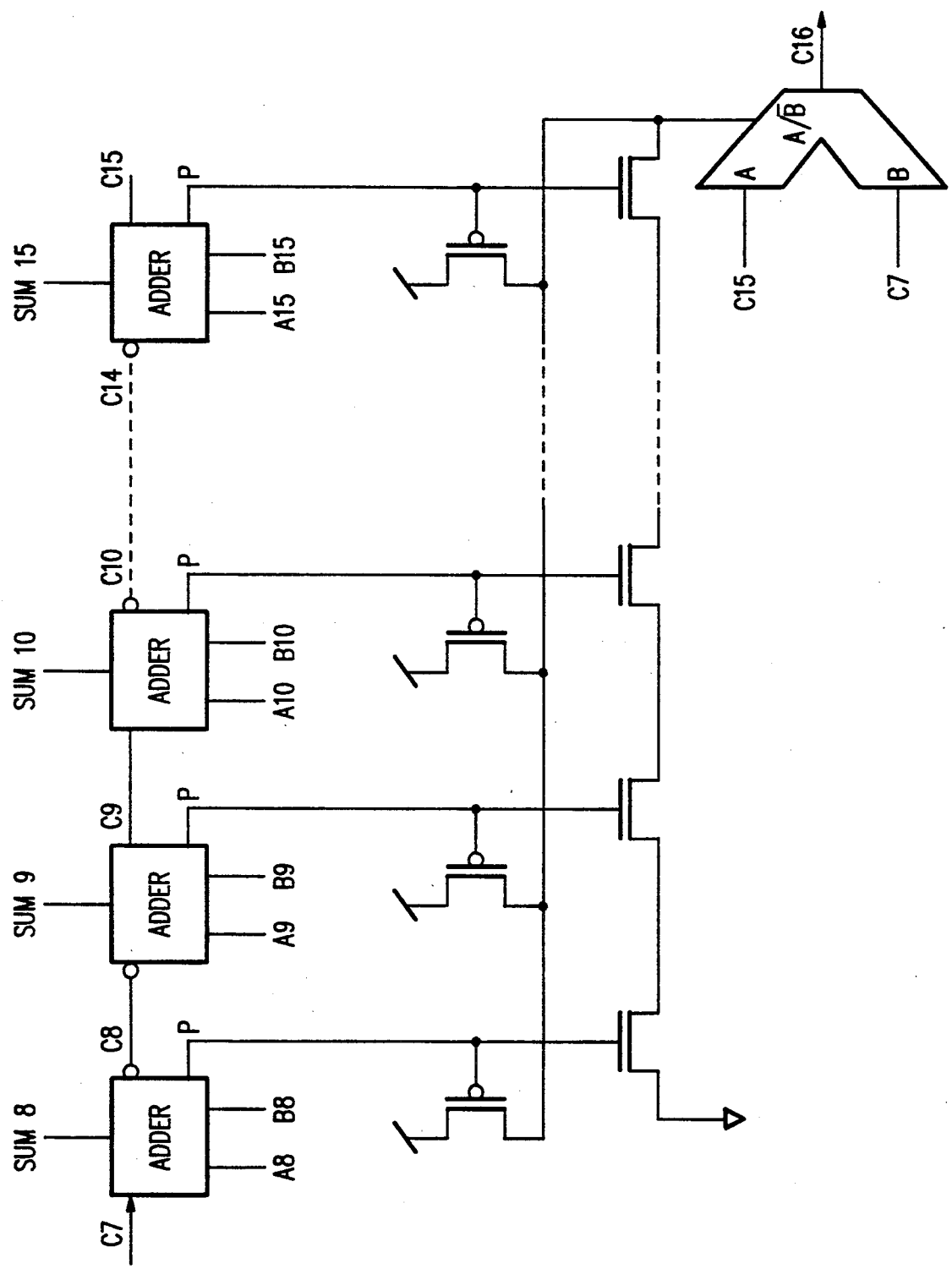
FIG. 17 is a schematic diagram illustrating an embodiment of an adder utilizable in the FIG. 10 multiplier/accumulator unit.

Referring to FIG. 17, the Adder 124 is a static 32-bit full adder. It has a static carry chain with one inversion per stage. There is a two stage carry bypass such that the maximum number of stages the carry has to ripple through is 15. The carry bypass is not physically part of the bit slice.

The adder cell implements the logical function shown in Table V:

TABLE V

| ncin | A | B | Sum | ncout |
|---|---|---|---|---|
| 1 | 0 | 0 | 0 | 1 |
| 1 | 0 | 1 | 1 | 1 |
| 1 | 1 | 0 | 1 | 1 |
| 1 | 1 | 1 | 0 | 0 |
| 0 | 0 | 0 | 1 | 1 |
| 0 | 0 | 1 | 0 | 0 |
| 0 | 1 | 0 | 0 | 0 |
| 0 | 1 | 1 | 1 | 0 |

The standard method of using a precharged carry has an advantage of area. However, the carry must wait for the clock edge to propagate. A static carry can take advantage of an early setup of the Adder inputs to begin propagation immediately. Although the number of transistors required is more (3 per stage average), the potential advantage in overall speed and the circuit benefits of static versus dynamic logic outweigh the slight area increase.

It can be seen that the value of the carry out can be determined directly from the input values of A and B, when A and b have the same value. When A=B=1, ncout is zero. When A=B=0, ncout is one. Only when A and B are not equal do we care about the value of carry in. Therefore, when A=B, carry out can be generated directly by the inversion of either A or B. In this case, B is chosen due to timing considerations. In order for there to only be 1 inversion per stage, every other carry bit is inverted. The same basic adder cell can be used for every stage if the following provisions are made:

1. The XOR of the carry in with the XOR of A and B has to be selectable for the case of ncin or cin.

2. The B input used to generate carry when A=B must be inverted for the stages that have ncin and cout.

Figure 18:
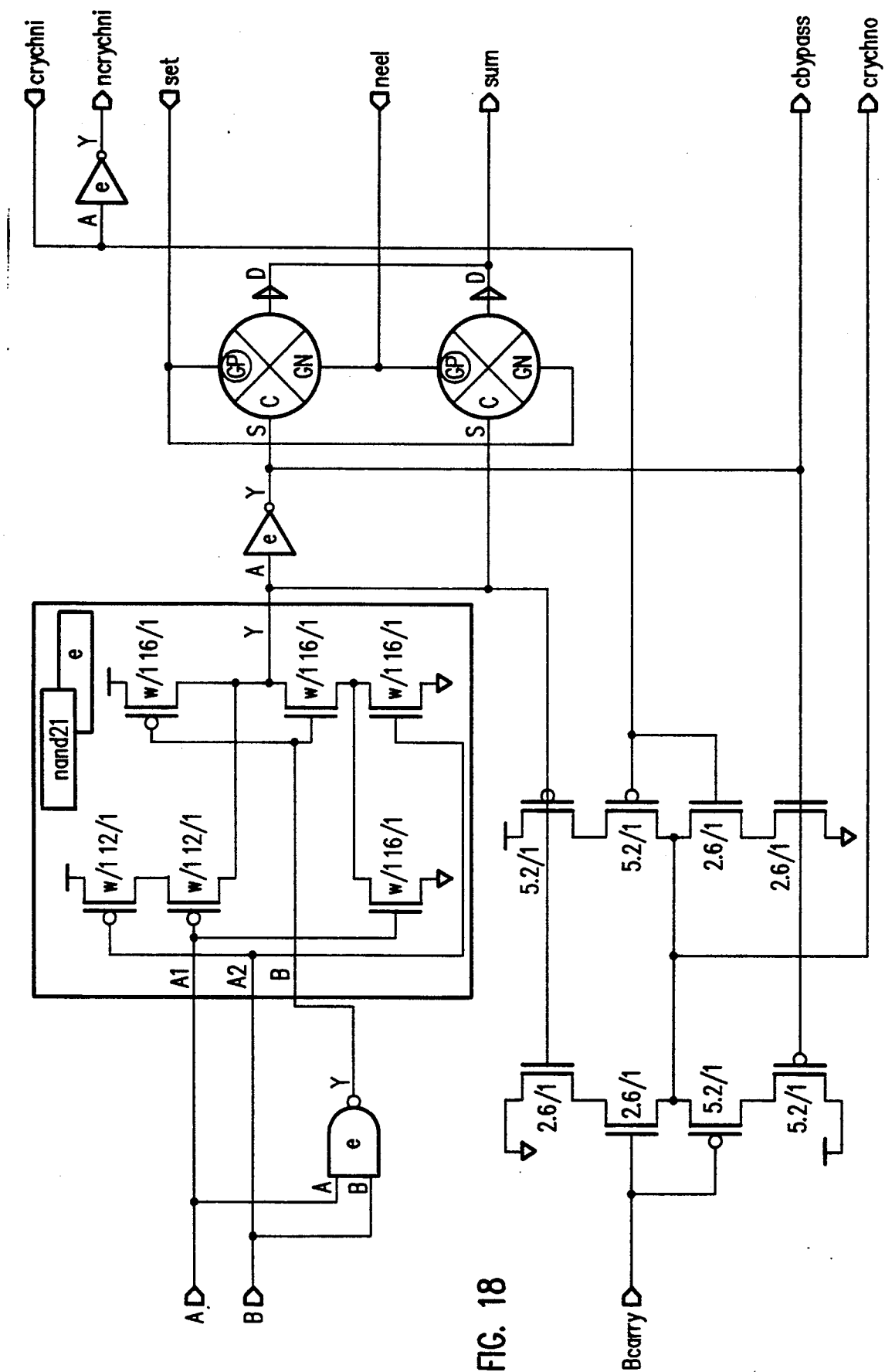
FIG. 18 is a schematic diagram illustrating an embodiment of a basic bitslice adder cell utilizable in implementing the FIG. 17 adder.

FIG. 18 shows the basic bit-slice adder cell. When the Adder 124 is used for even bits, ncin is the input and cout is the carry output. The B input must be inverted for the correct carry polarity. When the adder is used for odd bits, cin is the input and ncout is the outputs. In this case, the B input does not need to be inverted.

In the basic adder cell shown in FIG. 18, the signal bypass indicates that the carry chain is being propagated in that stage. The carry bypass logic is an 8 input NAND gate that selects 1 of two inputs to a mux output in order to bypass 8 bits of carry. The carry output of bit 7 can be directed to the carry input of bit 16 in the case that bits 8 through 15 all have a propagated carry. In addition, a second 2 input mux allows carry out bits 7, 15 or 23 to be passed to the carry in of bit 24. The worst case will have fifteen stages of ripple and four stages of carry bypass. The carry bypass logic has the ripple time of stages 1 through 7 to get settled in order for there to be no additional delay to the carry bypass.

Figure 19:
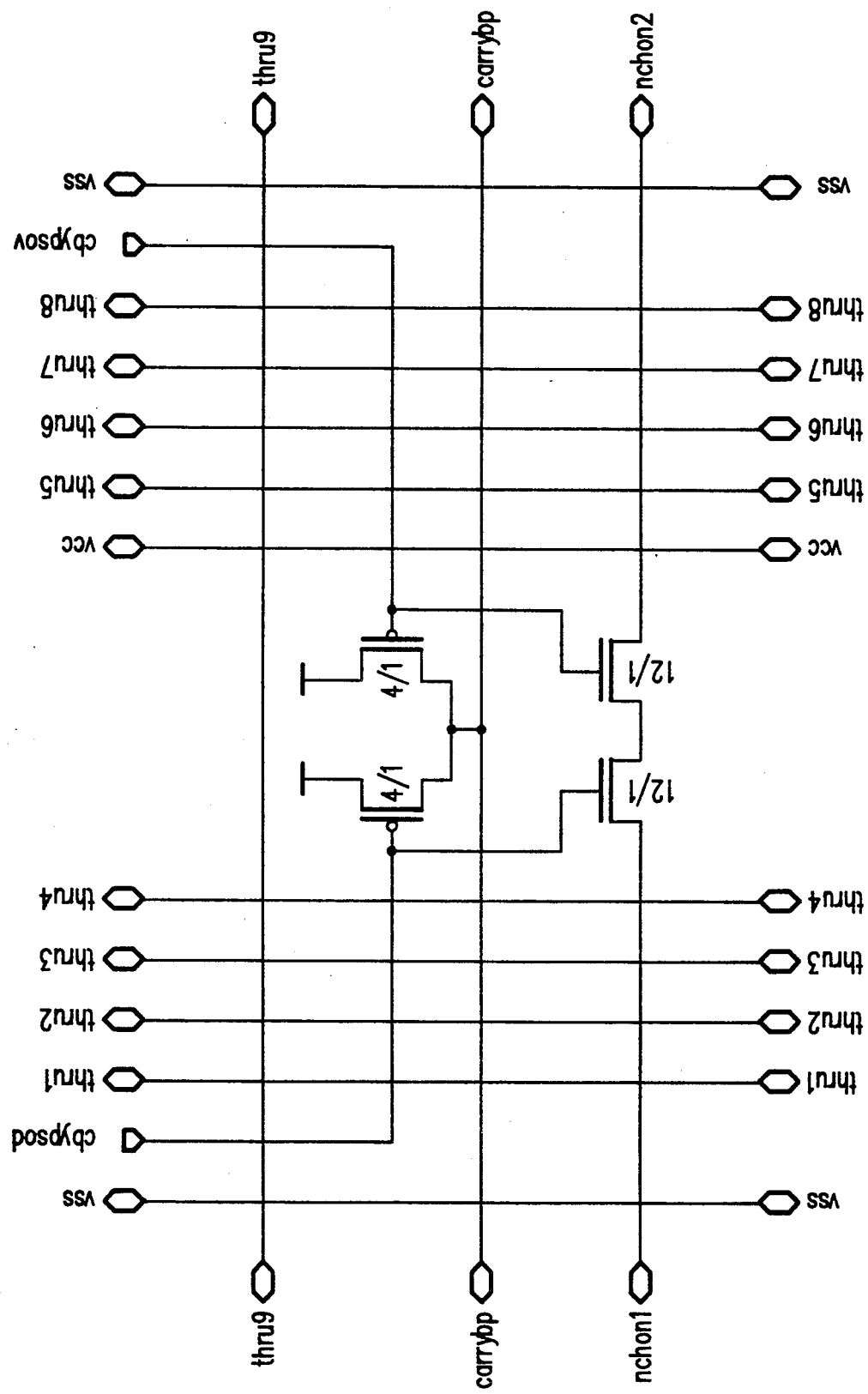
FIG. 19 is a schematic diagram illustrating an embodiment of a basic carry bypass cell utilizable in implementing the FIG. 17 adder.
Figure 20:
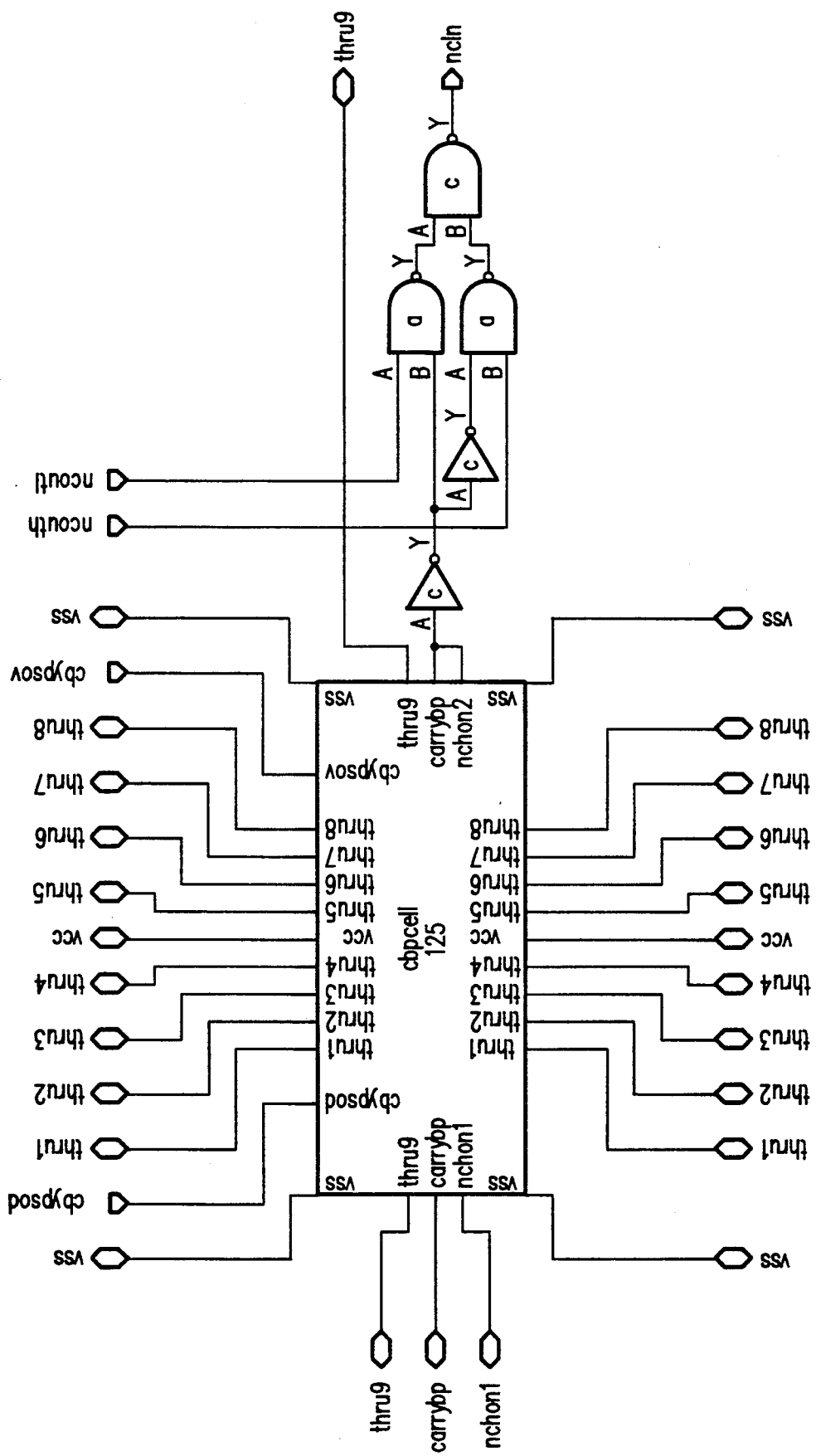
FIG. 20 is a schematic diagram illustrating an embodiment of a bitslice carry bypass end cell utilizable in implementing the FIG. 17 adder.

A schematic embodiment of the basic carry bypass cell is shown in FIG. 19. The last stage for the carry bypass is shown in FIG. 20. For the second carry bypass (bits 16–23), the output of the first stage carry bypass would be the ncoutl input to the second stage.

Figure 21A:
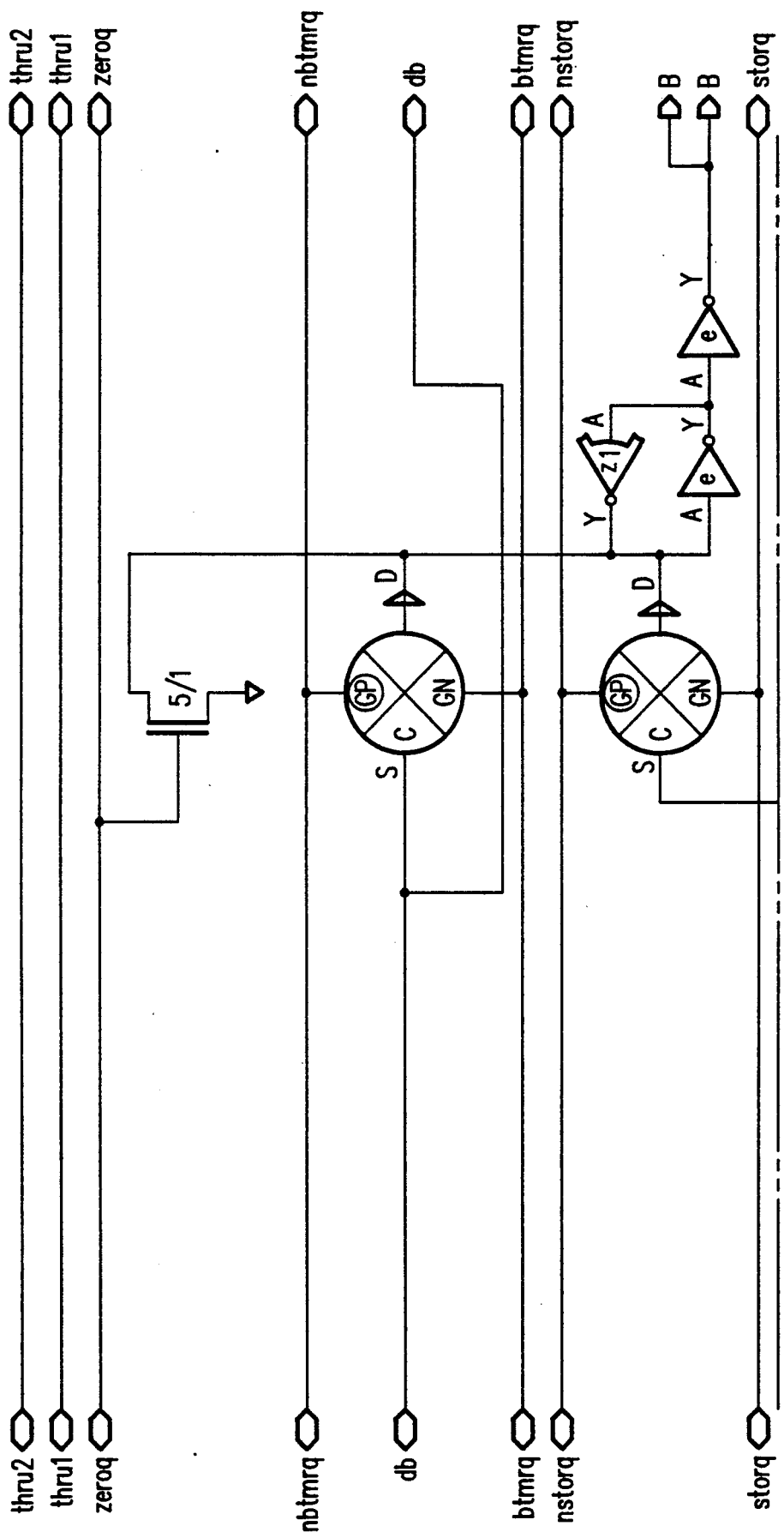
FIG. 21 includes FIGS. 21A, 21B and these figures show a schematic diagram illustrating an embodiment of a result register utilizable in implementing the FIG. 10 multiplier/accumulator unit.
Figure 21B:
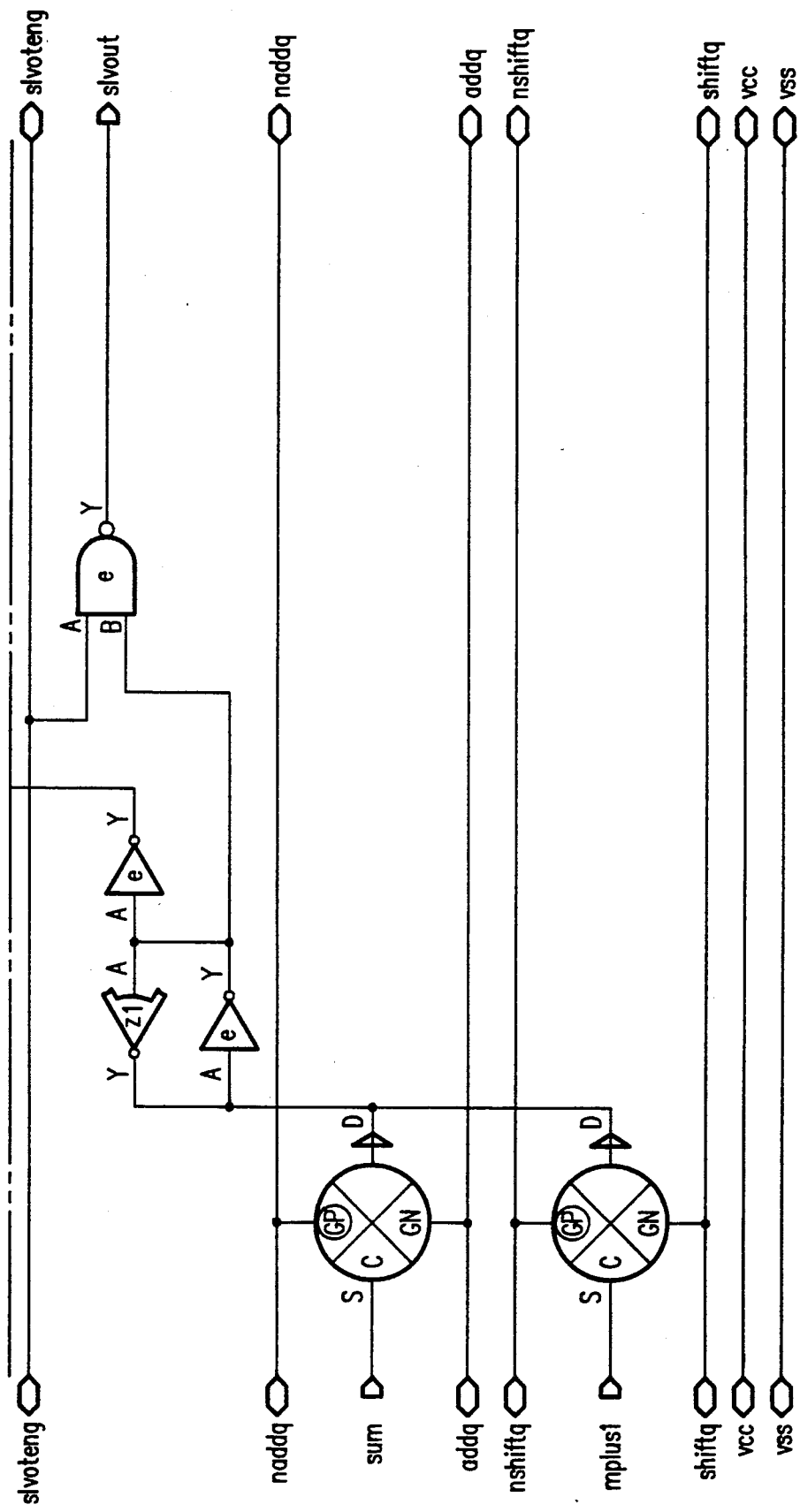

The result register 126 is both a 32 bit storage and an arithmetic right shifter (ASHR). The result register 126 is arranged in two rows of 16. The low word is the top row, and the high word is in row two. The basic result register cell is shown in FIG. 21. As shown in FIG. 10, it is a master/slave register. The slave latch has two inputs; the master latch has three inputs.

When the result register 126 is used as a storage element for the adder 124, the sum output of the adder 124 is transferred into the slave under control of the MAU control block 121. The slave is then transferred into the master. The output of the master is the B input to the adder 124.

When used for an arithmetic right shift, the input to the slave comes from the output of the master one binary bit position to the left. The control enable signals ADD and SHIFT (FIG. 10) are mutually exclusive. The equations for addq and shiftq are as follows:

$addq = ADD * C2$ $shiftq = SHIFT * C2$

As stated above, the MAU 104 generates sticky flag bits, having mutually exclusive true states, representing a signed arithmetic overflow of the accumulated data. The sticky flag bits represent the polarity, i.e. positive or negative, of the accumulated data. Once a sticky flag bit has been set true, no other sticky flag bit can be set true until all sticky flag bits have been reset to their false states.

Figure 23:
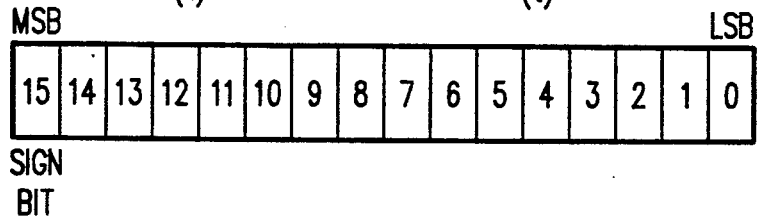
FIG. 23 illustrates the format of multiplier and accumulate data.

As described above, the MAU 104 receives multiplier data and multiplicand data via the system bus 106. The multiplier and multiplicand data each include 16 bits, the most significant bit, i.e. bit 15, being the sign bit representing the polarity of the multiplier or multiplicand data, as shown in FIG. 23.

Figure 24:
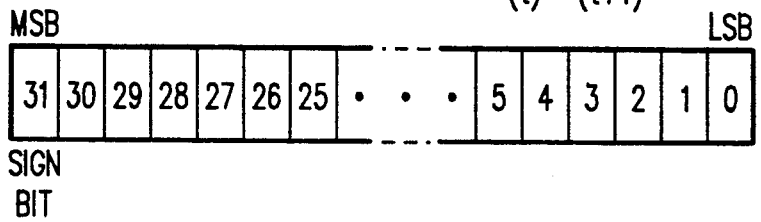
FIG. 24 illustrates the format of multiplied and accumulated data.

MAU 104 selectively multiplies and accumulates the multiplier and multiplicand data as described above to produce multiplied and accumulated data having 32 bits, the most significant bit, i.e. bit 31, being the sign bit representing the polarity of the multiplied and accumulated data, as shown in FIG. 24.

Figure 22:
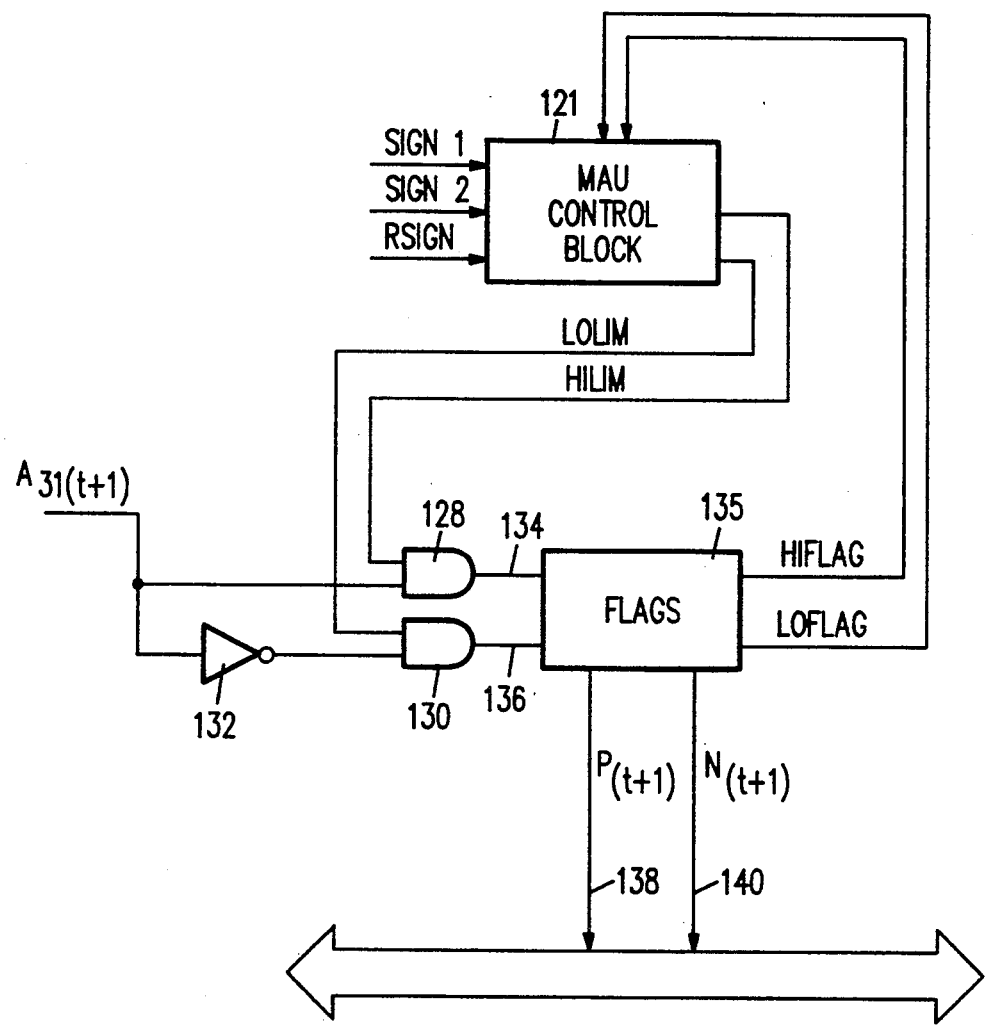
FIG. 22 is a block diagram illustrating generation of overflow/underflow sticky flags in accordance with the present invention.

As shown in FIG. 22, the MAU 104 provides three signals to the MAU control block 121: a signal (SIGN2 in FIG. 10) representing the multiplier data sign bit $O_{15(t)}$; a signal (SIGN1 in FIG. 10) representing the multiplicand data sign bit $M_{15(t)}$; and a signal (RSIGN in FIG. 10) representing the multiplied and accumulated data sign bit $A_{31(t)}$. The MAU control block 121 also receives a signal (HIFLAG in FIG. 10) representing the positive signed overflow sticky flag bit $P_{(t)}$ and a signal (LOFLAG in FIG. 10) representing the negative signed overflow sticky flag bit $N_{(t)}$.

These five signals, SIGN2, SIGN1, RSIGN, HIFLAG and LOFLAG, represent the sign bits $O_{15(t)}$, $M_{15(t)}$, $A_{31(t)}$ and sticky flag bits $P_{(t)}$, $N_{(t)}$, respectively, at a time interval t (e.g. clock cycle) immediately preceding the present multiplication and accumulation step to be executed by the MAU 104. Based upon these input signals, the MAU control block 121 provides two enabling signals HILIM and LOLIM (FIG. 10) for the AND gates 129 and 130, respectively, as discussed in greater detail below.

The MAU 104 provides an output signal representing the sign bit $A_{31(t+1)}$ for the multiplied and accumulated data at a time interval $t+1$, i.e. a time interval (clock cycle) immediately following the present multiplication and accumulation step. This signal and its complement (created by the inverter are selectively passed, i.e. gated, by the AND gates 128 and 130 in accordance with the aforementioned enabling signals HILIM and LOLIM. This produces two signals 134 and 136, only one of which is true, i.e. set to a logical one, at any point in time. These signals 134 and 136 are stored in the sticky flag bits register 135 (FIG. 10) as the values for the sticky flag bits $P_{(x)}$, $N_{(x)}$ (where $X \epsilon \{t, t+1\}$). These sticky flag bits $P_{(x)}$, $N_{(x)}$ are provided via two signals 138 and 140 to the system bus 106.

In accordance with the foregoing discussion, the sticky flag bits $P_x$, $N_{(x)}$ are generated in accordance with the following formulas:

$$P_{(t+1)} = \overline{A}_{31(t)}(O_{15(t)} \odot M_{15(t)})\overline{P}_{(t)}\overline{N}_{(t)}A_{31(t+1)} + P_{(t)}$$

$$N_{(t+1)} = A_{31(t)}(O_{15(t)} \oplus M_{15(t)})\overline{P}_{(t)}\overline{N}_{(t)}\overline{A}_{31(t+1)} + N_{(t)}$$

where:
- $P_{(t)}$ = state of positive signed overflow bit at a time interval t
- $N_{(t)}$ = state of negative signed overflow bit at a time interval t
- $P_{(t+1)}$ = state of positive signed overflow bit at a subsequent time interval $t+1$
- $N_{(t+1)}$ = state of negative signed overflow bit at a subsequent time interval $t+1$
- $A_{31(t)}$ = state of accumulated data bit 31 at a time interval t
- $A_{31(t+1)}$ = state of accumulated data bit 31 at a subsequent time interval $t+1$
- $O_{15(t)}$ = state of multiplier data bit 15 at a time interval t
- $M_{15(t)}$ = state of multiplicand data bit 15 at a time interval t
- $\odot$ = equivalence
- $\ominus$ = exclusive OR The signed overflow sticky flag bits $P_x$, $N_{(x)}$ indicate when the result of an arithmetic step (i.e. a multiplication and accumulation step) exceeds the representation capability of the arithmetic unit, and whether that result has overflowed positively or negatively. The flag bits are "sticky" to avoid having to check their status after every arithmetic operation which could possibly result in an overflow condition. Since the flags are "sticky," a check on their status can be done after a number of arithmetic operations to determine whether an overflow condition has resulted, and if so, in what direction (i.e. polarity) first. The two sticky flag bits have mutually exclusive true states so that once a flag has been set true, the other flag cannot be set true until both flags have been reset to their false states. Thus, if a sticky flag bit is found to be true, it is then known what the polarity was, i.e. positive or negative, of the first overflow condition.

Figure 25:
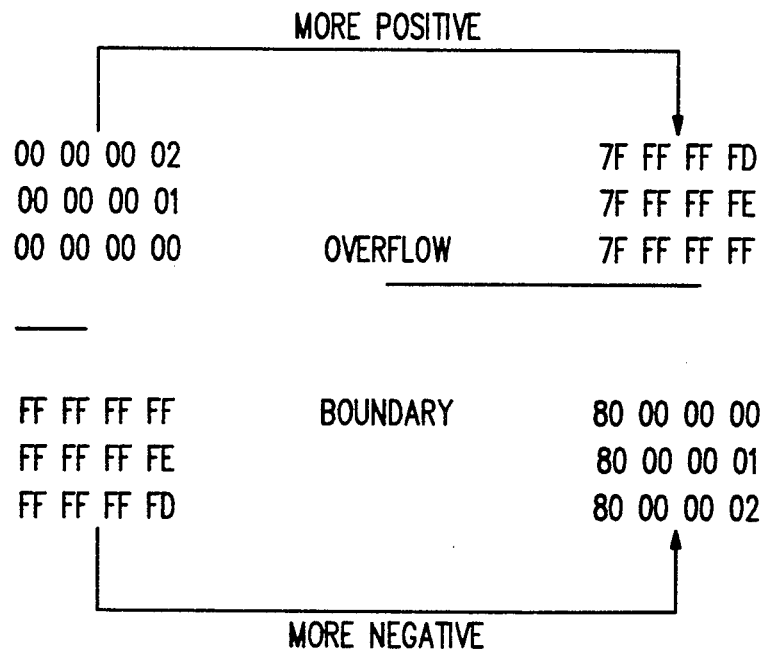
FIG. 25 illustrates positive and negative overflow conditions occurring after a multiplication or accumulation step.

These possibilities of a positive or negative overflow condition occurring after a multiplication and accumulation step can be better visualized by referring to in FIG. 25.

According to the foregoing, it can be seen that the signal representing the positive signed overflow bit $P_{(t+1)}$ will be set equal to the same logic state as the signal representing the multiplied and accumulated data sign bit $A_{31(t+1)}$ immediately following the present multiplication and accumulation step where: the logical states of the signals representing the immediately preceding (with respect to time) signed overflow flag bits $P_{(t)}$, $N_{(t)}$ are both false (i.e. logical zeroes); the logical state of the signal representing the immediately preceding (with respect to time) multiplied and accumulated data sign bit $A_{31(t)}$ is false, thereby representing a positively signed value; and the logical states of the signals representing the multiplier $O_{15(t)}$ and multiplicand $M_{15(t)}$ sign bits are equal.

It should be further seen that the logical state of the signal representing the negative signed overflow flag bit $N_{(t+1)}$ will be equal to the inverse of the logical state of the signal representing the multiplied and accumulated data sign bit $A_{31(t+1)}$ immediately following the present multiplication and accumulation step where: the logical states of the signals representing the immediately preceding (with respect to time) signed overflow flag bits $P_{(t)}$, $N_{(t)}$ are both false; the logical state of the signal representing the immediately preceding (with respect to time) multiplied and accumulated data sign bit $A_{31(t)}$ is true, i.e. a logical one, thereby representing a negative value; and the logical states of the signals representing the multiplier $O_{15(t)}$ and multiplicand $M_{15(t)}$ data sign bits are unequal.

By providing sticky signed overflow flag bits according to the foregoing discussion, the present invention provides for two options when dealing with signed multiplied and accumulated data. In accordance with the positive and signed overflow flag bits, the actual signed value of the multiplied and accumulated data can be used, or alternatively, with the knowledge that a signed overflow condition has occurred, the maximum, or "rail," positive or negative data values can be used, i.e. 7FFFFFFF (hexadecimal) for the maximum positive value or 80000000 (hexadecimal) for the maximum negative value.

It should be understood that various alternatives to the embodiments of the inventions described herein may be employed in practicing the invention. It is intended that the following claims define the scope of the invention and that structures and methods within the scope of these claims and their equivalents be covered thereby.

What is claimed is:

1. A multiply/accumulate unit for multiplying and accumulating binary data, the multiply/accumulate unit being physically formed as part of a monolithic integrated circuit die, the multiply/accumulate unit comprising:
   (a) a multiplier register for storing a 16-bit binary multiplier value;
   (b) a multiplicand input register for storing 16 bits of a 32-bit binary multiplicand value;
   (c) a multiplicand register connected to the multiplicand input register for storing a 32-bit binary multiplicand value received by the multiplicand register via the multiplicand input register;
   (d) an arithmetic unit connected to the multiplier register and to the multiplicand register for multiplying the binary multiplier value received from the multiplier register and the binary multiplicand value received from the multiplicand register to provide a 32-bit product; and (e) a 32-bit accumulator register connected to the arithmetic unit for storing the product received from the arithmetic unit wherein the multiplicand register is physically arranged in four rows of 8 bits each, the top row containing the even bits for the low word, the second row containing the even bits for the high word, the third row containing the odd bits for the low word, and the fourth row containing the odd bits for the high word, whereby the arrangement of the multiplicand register allows left shift by two directly across with a single loop around between bits 14-16 and 15-17 and whereby the 16-bit input register fits exactly across the top of a multiplicand stack.

* * * * *